United States Patent
Finn et al.

(10) Patent No.: US 9,619,944 B2
(45) Date of Patent: *Apr. 11, 2017

(54) COORDINATE GEOMETRY AUGMENTED REALITY PROCESS FOR INTERNAL ELEMENTS CONCEALED BEHIND AN EXTERNAL ELEMENT

(71) Applicant: F3 & Associates, Inc., Benicia, CA (US)

(72) Inventors: Sean Finn, Benicia, CA (US); Carlo Caparas, San Jose, CA (US); Eric Horbatiuk, Oakland, CA (US); Mike Heitman, San Francisco, CA (US)

(73) Assignee: F3 & ASSOCIATES, INC., Benicia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,381

(22) Filed: May 18, 2016

(65) Prior Publication Data
US 2016/0292927 A1    Oct. 6, 2016

Related U.S. Application Data

(63) Continuation of application No. 14/846,548, filed on Sep. 4, 2015, now Pat. No. 9,367,963, which is a
(Continued)

(51) Int. Cl.
*G06T 19/00* (2011.01)
*G06T 7/00* (2006.01)
(Continued)

(52) U.S. Cl.
CPC .......... *G06T 19/006* (2013.01); *G01C 15/002* (2013.01); *G06K 9/00671* (2013.01);
(Continued)

(58) Field of Classification Search
None
See application file for complete search history.

(56) References Cited

U.S. PATENT DOCUMENTS 6,094,625 A    7/2000  Ralston
6,166,744 A    12/2000 Jaszlics
(Continued)

OTHER PUBLICATIONS

'Real-time markerless tracking of objects on mobile devices', Bachelor of Science Thesis, by Elisa Ziegler, University of Koblenz and Landau, Jun. 2010.*
(Continued)

*Primary Examiner* — James A Thompson
(74) *Attorney, Agent, or Firm* — Kilpatrick Townsend & Stockton LLP

(57) ABSTRACT

Embodiments of the invention include a method, a system, and a mobile device that incorporates augmented reality technology and digital modeling processes. By incorporating the augmented reality technology, a 3D digital model of internal elements concealed behind an external element can be visualized on a live view, aligned to the orientation and scale of the scene displayed on the mobile device. In an embodiment, a marker can be placed on the external element. The 3D digital model of the internal elements can be retrieved by the mobile device and overlaid in relation to the marker position, orientation, and size so that it is seen at a calculated distance in depth behind the external element as they would exist hidden behind the external element in the real environment.

14 Claims, 12 Drawing Sheets

Related U.S. Application Data continuation of application No. 14/018,724, filed on Sep. 5, 2013, now Pat. No. 9,159,166.

(60) Provisional application No. 61/758,606, filed on Jan. 30, 2013.

(51) Int. Cl.

| | | |
|---|---|---|
| *G01C 15/00* | (2006.01) | |
| *H04N 13/02* | (2006.01) | |
| *G06T 11/60* | (2006.01) | |
| *H04W 88/02* | (2009.01) | |
| *G06K 9/00* | (2006.01) | |
| *G06K 9/32* | (2006.01) | |
| *G06K 9/20* | (2006.01) | |
| *G06K 9/22* | (2006.01) | |

(52) U.S. Cl.
CPC ............ *G06K 9/2063* (2013.01); *G06K 9/22* (2013.01); *G06K 9/3208* (2013.01); *G06T 7/0042* (2013.01); *G06T 7/0051* (2013.01); *G06T 11/60* (2013.01); *H04N 13/0275* (2013.01); *H04W 88/02* (2013.01); *G06T 2200/04* (2013.01); *G06T 2200/08* (2013.01); *G06T 2207/30204* (2013.01); *G06T 2215/16* (2013.01)

(56) References Cited

U.S. PATENT DOCUMENTS

| | | | |
|---|---|---|---|
| 6,375,874 | B1 | 4/2002 | Russell et al. |
| 7,216,003 | B2 | 5/2007 | Faulkner et al. |
| 7,365,891 | B2 | 4/2008 | Hoffman et al. |
| 7,424,335 | B2 | 9/2008 | Swift |
| 9,367,963 | B2 * | 6/2016 | Finn .................... G01C 15/002 |
| 2005/0035980 | A1 | 2/2005 | Lonsing et al. |
| 2005/0102063 | A1 | 5/2005 | Bierre |
| 2008/0252640 | A1 | 10/2008 | Williams et al. |
| 2008/0269939 | A1 | 10/2008 | Kritchman |
| 2009/0173443 | A1 | 7/2009 | Kozlak |
| 2011/0134108 | A1 | 6/2011 | Hertenstein |
| 2011/0279445 | A1 | 11/2011 | Murphy et al. |
| 2011/0317880 | A1 | 12/2011 | Pettersson et al. |
| 2012/0327114 | A1 | 12/2012 | Nahon et al. |
| 2012/0327117 | A1 | 12/2012 | Weller et al. |
| 2013/0057581 | A1 | 3/2013 | Meier et al. |
| 2013/0147839 | A1 | 6/2013 | Fukushima et al. |
| 2013/0155106 | A1 | 6/2013 | Rolleston et al. |
| 2013/0251199 | A1 | 9/2013 | Raghoebardayal et al. |
| 2013/0293585 | A1 | 11/2013 | Sudou et al. |
| 2014/0210856 | A1 | 7/2014 | Finn et al. |
| 2014/0275760 | A1 | 9/2014 | Lee et al. |

OTHER PUBLICATIONS

Office Action mailed Oct. 2, 2015 in U.S. Appl. No. 13/930,369, 9 pages.
Leica ScanStation C10 The All-in-One Laser Scanner For Any Application www.leica-geosystems.com/hds 2012.
Make Your Ideas Real Give Your Creativity A New Dimension by Stratasys 2012.
Faro Edge 2012.
AutoCAD 2012.
Fortus 3D Production Systems 2012.
U.S. Appl. No. 13/930,369 , "Notice of Allowance", Jan. 7, 2016, 5 pages.
U.S. Appl. No. 14/018,724 , "Non-Final Office Action", Jul. 22, 2015, 17 pages.
U.S. Appl. No. 14/018,724 , "Notice of Allowance", Aug. 26, 2015, 7 pages.
U.S. Appl. No. 14/846,548 , "Non-Final Office Action", Nov. 10, 2015, 15 pages.
U.S. Appl. No. 14/846,548 , "Notice of Allowance", Feb. 18, 2016, 8 pages.

* cited by examiner

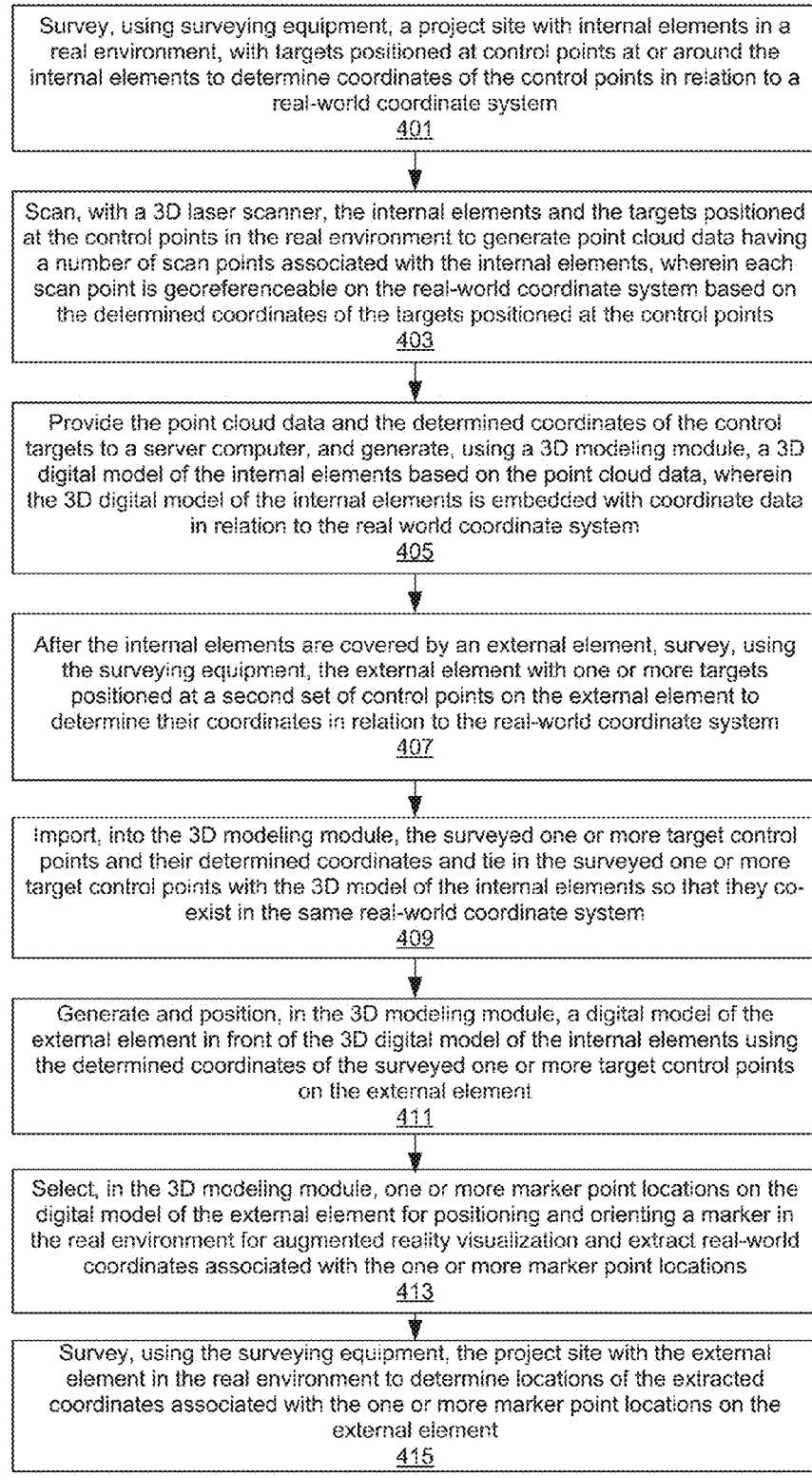
FIG. 4A  (Continue in FIG. 4B)

COORDINATE GEOMETRY AUGMENTED REALITY PROCESS FOR INTERNAL ELEMENTS CONCEALED BEHIND AN EXTERNAL ELEMENT

CROSS-REFERENCES TO RELATED APPLICATIONS

This application is a continuation of U.S. patent application Ser. No. 14/846,548, filed on Sep. 4, 2015, which is a continuation application of and claims the benefit of priority of U.S. patent application Ser. No. 14/018,724, filed on Sep. 5, 2013, which claims priority to U.S. Provisional Patent Application No. 61/758,606, filed Jan. 30, 2013, entitled "Coordinate Geometry Augmented Reality Process," the disclosures of which are all hereby incorporated by reference in their entirety for all purposes. This application is also related to U.S. patent application Ser. No. 13/930,369, filed Jun. 28, 2013, entitled "Coordinate Geometry Augmented Reality Process," the disclosure of which is hereby incorporated by reference in its entirety for all purposes.

BACKGROUND

In the fields of architecture, design, and construction, ideas and plans need to be communicated clearly to coordinate successfully with all parties involved in a project. When a project involves modifying an existing structure or constructing a new structure, a new design for the structure can be generated in the form of a virtual three dimensional ("3D") model using computer modeling software. The virtual 3D model can be viewed on a computer screen so that all of the involved parties can discuss their ideas. However, the 3D modeling software is not easy to use for people unless they are trained to use the software. Therefore, all the parties may not be able to fully participate in the discussion, while manipulating the 3D digital model shown on the computer screen. Furthermore, while virtual 3D models can help a person visualize the project on a computer screen, it is not easy for the human brain to translate the information shown on the computer screen and visualize it on-site in the real world. Thus, there is a need to improve the presentation and planning of future projects in the fields of architecture, design, and construction.

Embodiments of the invention address this and other problems, individually and collectively.

SUMMARY

The present invention relates generally to utilizing augmented reality ("AR") technology and digital modeling processes. More specifically, the present invention relates to methods and systems for providing an augmented reality image which combines a real-time, real view of an external element (e.g., a wall or a ceiling) in a real environment, overlaid with an image of a 3D digital model of internal elements (e.g., pipes, conduits, and/or wall studs) as they exist hidden behind the external element. By incorporating the AR technology into land surveying, 3D laser scanning, and digital modeling processes, the 3D digital model of the internal elements is overlaid on the live view of the mobile device, aligned to the orientation and scale of the scene shown on the mobile device. In an embodiment, the 3D digital model can be visualized in a geometrically correct orientation with respect to the external element as the internal elements would exist hidden behind the external element in the real world environment. The methods and techniques described herein can be applied to a variety of fields including architecture, design, and construction.

According to one embodiment of the present invention, a method provides coordinate geometry augmented reality for visualizing 3D digital models of internal elements concealed behind external elements in a real environment. The method includes capturing, using a camera of a mobile device, an image of a marker placed on an external element covering internal elements in the real environment. The method also includes analyzing, using a processor, the image of the marker to determine a 3D digital model of the internal elements associated with the marker. The method further includes retrieving, from data storage, a data file comprising the 3D digital model of the internal elements associated with the marker and relation data between the 3D digital model of the internal elements and the marker. Then, on a display screen of the mobile device, an augmented reality image comprising a real view of the external element seen through the camera of the mobile device in real-time is overlaid with the 3D digital model of the internal elements in relation to the marker according to the relation data. This way, the 3D digital model of the internal elements is seen in a geometrically correct orientation with respect to the external element at a calculated distance in depth behind the external element in the real environment.

According to another embodiment of the present invention, a mobile device provides coordinate geometry augmented reality for visualizing 3D digital models of internal elements concealed behind external elements in a real environment. The mobile device comprises a processor and a computer-readable medium coupled to the processor and storing a plurality of instructions, which, when executed, cause the processor to provide coordinate geometry augmented reality. The plurality of instructions includes instructions that cause the processor to capture, using a camera of a mobile device, an image of a marker placed on an external element covering internal elements in the real environment. The plurality of instructions also includes instructions that cause the processor to analyze the image of the marker to determine a 3D digital model of the internal elements associated with the marker. The plurality of instructions further include instructions that cause the processor to retrieve, from data storage, a data file comprising the 3D digital model of the internal elements associated with the marker and relation data between the 3D digital model of the internal elements and the marker. In addition, the plurality of instructions includes instructions that cause the processor to provide, on a display screen of the mobile device, an augmented reality image comprising a real view of the external element seen through the camera in real-time, overlaid with the 3D digital model of the internal elements in relation to the marker according to the relation data. This way, the 3D digital model of the internal elements can be seen in a geometrically correct orientation with respect to the external element at a calculated distance in depth behind the external element.

These and other embodiments of the invention are described in further detail below with references to the Figures and the Detail Description.

BRIEF DESCRIPTION OF THE DRAWINGS

FIGS. 4A-4C shows a flow diagram illustrating a method of land surveying, 3D laser scanning, 3D modeling, associating a 3D digital model of internal elements with a marker, and AR processing according to an embodiment of the present invention.

DETAILED DESCRIPTION

Figure 1:
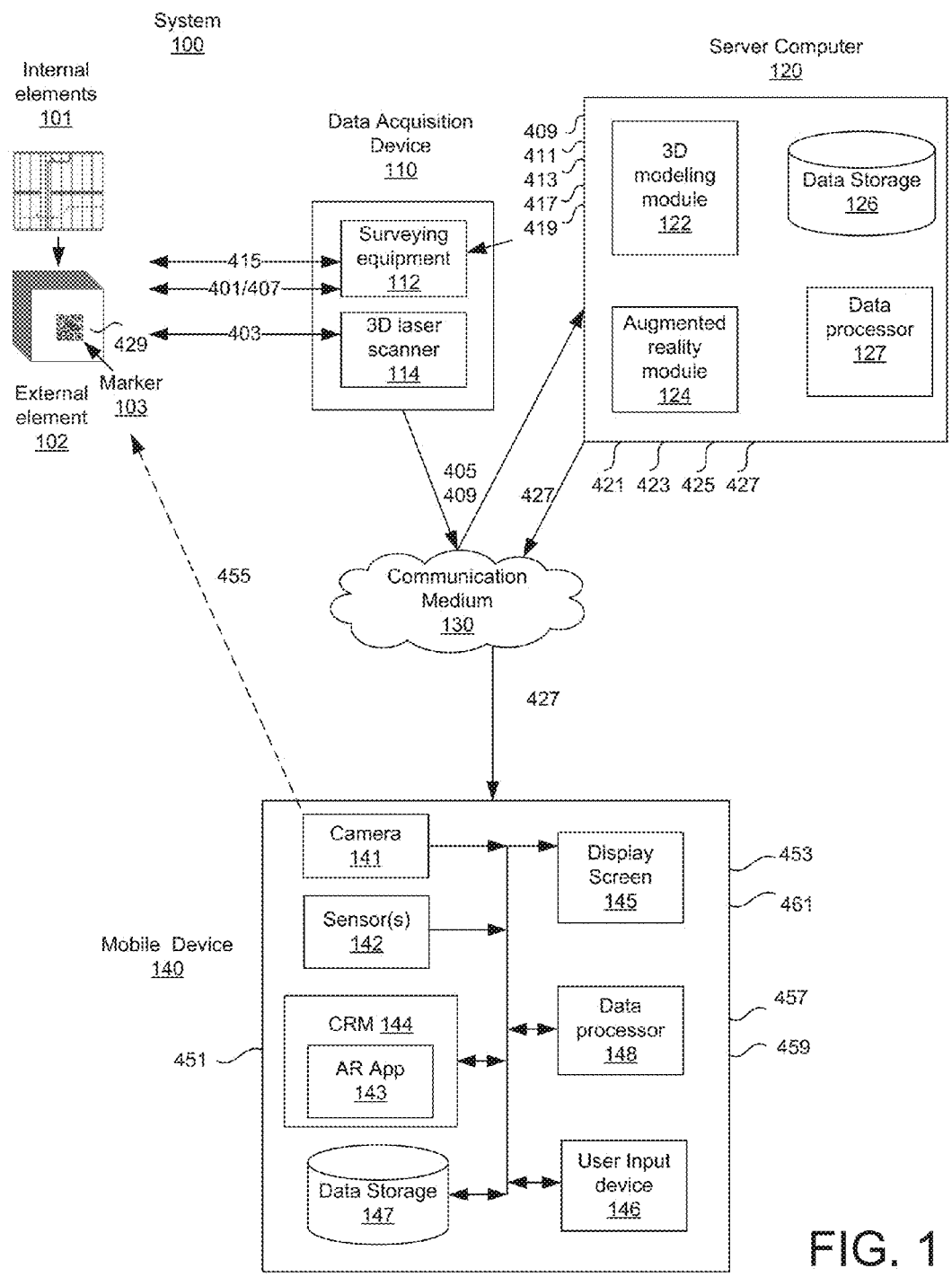
FIG. 1 shows a block diagram of a system according to an embodiment of the invention.

In industrial facilities such as hospitals or laboratories, there are many types of internal elements behind the walls and the ceilings. The internal elements can refer to any structural, mechanical, electrical, or other features concealed behind an external element (e.g., a wall, a ceiling, flooring, or the like) which is exposed and visible to the user. Examples of internal elements can include air pipes, gas pipes, electrical conduits, and other features. An external element can also be a ground surface (e.g., pavement or dirt ground) and its internal elements can be any utility lines buried underground. It is important to know the locations of these internal elements which are concealed behind the walls, ceilings, or underground because they may need to be upgraded over time or need to be fixed when problems arise.

In embodiments of the present invention, accurate locations of internal elements can be determined and visualized through the integration of land surveying, 3D laser scanning, digital modeling, and AR processes. This integrative adaption of AR enables design engineers and maintenance crews equipped with mobile computing devices (e.g., tablet computers) at the job site to "see" hidden building features (e.g., mechanical, electrical, and structural elements) displayed onscreen in their accurate as-built locations in the real environment.

As an illustration, to visualize internal elements (e.g., studs, pipes, or conduits) hidden behind a finished wall, a 3D digital model of internal elements can be generated. The 3D digital model can be generated using a blueprint of a building which is used to construct the building. Alternatively, it can be generated from point cloud data obtained from surveying and laser scanning the internal elements during construction of the building while the internal elements are exposed, prior to being covered by a sheetrock or other wall finish. After the wall is finished, a marker for augmented reality visualization is placed at a specific set of coordinates on the finished wall determined by surveying equipment. In an embodiment, the marker is placed at a calculated distance in front of the internal elements where the distance can be determined based on surveyed and laser scanned data. To view the internal elements that have been scanned and modeled, a user can activate a mobile device camera and point the device at an area of interest. If the camera detects the marker on the finished wall in the real-life scene, the mobile device will decode the marker to retrieve the 3D digital model of the internal element associated with the marker. The augmented reality application of the mobile device will then overlay the 3D model of the internal elements on the live view, aligned to the orientation and scale of the scene, even if the user moves around. Thus, in embodiments of the present invention, the 3D digital model of the internal elements can be visualized in the real environment at its precise location as the internal elements would exist at a calculated distance in depth behind the finished wall.

Embodiments of the present invention provide several advantages. Because most people are visual learners, augmented reality can be used as a tool to display virtual designs or 3D models in the context of the true, existing environment in real-time. This is particularly useful in the fields of architecture, design, and construction. For example, when designing a plant retrofit or upgrade, designers would have the capability of viewing the existing internal elements at the job site, prior to creating a new design element to replace or modify the existing internal elements. The design plans can be changed on-site when engineers and designers walk the project site, visualizing how various internal elements interconnect within the context of the entire facility. Thus, embodiments of the present invention can improve overall efficiency of a project in terms of time and cost. In another example, engineers can visualize key components of internal elements concealed behind an external element on-site so that potential problematic areas associated with the key components (e.g., a coupling joint between two pipes) can be determined. Furthermore, through visualization of the internal elements via AR technology, portions of the external element can be selectively torn down to expose the key components of the internal elements for renovation. In addition, AR visualization of concealed internal elements at the job site reduces the likelihood of inadvertently damaging the internal elements during a retrofit or upgrade. Thus, the integration of augmented reality into the civil engineering industry is highly beneficial.

Examples of embodiments of the present invention are described in further detail below with reference to the Figures. The Figures described herein are used to illustrate embodiments of the present invention, and are not in any way intended to limit the scope of the invention.

FIG. 1 shows a schematic diagram illustrating a system 100 having a number of components that integrate AR technology with land surveying, 3D laser scanning, and 3D modelling processes according to an embodiment of the invention. The system 100 includes internal elements 101 (e.g., pipes) and an external element 102 (e.g., a wall), which are located on a project site in a real environment. After building a building, the internal elements 101 are concealed behind the external element 102. The system 100 also includes a data acquisition device 110 which is used to survey and laser scan the internal elements 101 (prior to being covered by the external element 102) to generate point cloud data with scan points at known coordinates. After being covered by the external element 102, the external element 102 can also be surveyed to determine its location (e.g., a distance in depth) in relation to the internal elements 101. The system 100 shown in FIG. 1 also includes a server computer 120 which receives the point cloud data from the data acquisition device 110 and generates a 3D digital model of the internal elements 101. The server computer 120 can also associate a 3D digital model of the internal elements with a marker 103 for augmented reality visualization. In addition, the system 100 includes a mobile device 140, which may be used to capture an image of the marker 103 placed on the external element 102 in the real environment to initiate and facilitate augmented reality visualization of a 3D digital model of the hidden internal elements 101 in a geometrically correct orientation with respect to the exernal element 102.

All the components shown in FIG. 1 (e.g., the data acquisition device 100, the server computer 120, and the mobile device 140) can communicate with one another via communication medium 130, which may be a single or multiple communication media. The communication medium 130 may include any suitable electronic data communication medium including wired and/or wireless links. The communication medium 130 may include the Internet, portions of the Internet, or direct communication links. In some embodiments, the components shown in FIG. 1 can receive data from one another by sharing a hard drive or other memory devices containing the data.

Referring to FIG. 1, the data acquisition device 110 may include surveying equipment 112 and a 3D laser scanner 114. The surveying equipment 112 and/or the 3D laser scanner 114 gather data from the internal elements 101 (prior to being covered by the external element 102) and from the external element 102 after the internal elements 101 are covered. While the surveying equipment 112 and the 3D laser scanner 114 are shown in the same enclosure 110, they can be separate devices in separate enclosures.

The surveying equipment 112 can be used to survey the internal elements 101 on a project site in a real environment. The targets are positioned at control points on or around the internal elements 101. Through surveying, the coordinates of the target control points in relation to a real world coordinate system can be determined. After the internal elements 101 are covered by the external element 102, the surveying process is repeated with the external element 102 to determine its location and coordinates in relation to a real-world coordinate system. Examples of surveying equipment include total stations, theodolites, digital levels, survey transits, or the like. The surveying equipment can be used to perform horizontal and/or vertical measurements to specify locations in 3D on the earth using coordinates. The surveying equipment typically reports each surveyed target's coordinates in terms of "Northing, Easting, Elevation."

In embodiments of the present invention, real-world coordinates of a control point or any location refers to its horizontal position on the surface of the earth and its vertical position (e.g., elevation). The horizontal position of a location can be defined by any suitable real-world coordinate system such as a global coordinate system, a national coordinate system, state coordinate system (e.g., NAD 83, NAD 88, or the like), a local plant grid system, or the like. The vertical position or an elevation of a location can be defined according to an elevation datum. An elevation datum may be based on an elevation above Mean Sea Level, a gravity based geodetic datum NAVD88, NAD 27, or the like. Any other suitable horizontal datum and elevation datum can be used to define a point or a location in space on the earth in terms of real-world coordinates.

The 3D laser scanner 114 shown in FIG. 1 captures the project site with the internal elements 101 in the real environment in the form of points called point clouds. Any suitable 3D laser scanner can be used in embodiments of the present invention. Examples of 3D laser scanners include Leica ScanStation™ manufactured by Leica Geosystems™, Trimble FX™ or GX™ Scanner manufactured by Trimble, other 3D laser scanners from other manufacturers, such as Faro™, Riegl™, Optech™, or the like.

While not illustrated in FIG. 1, the 3D laser scanner 114 includes a number of components, such as a laser emitter and a detector. In 3D laser scanning, a laser beam is emitted from a laser emitter which is reflected off the surface of a physical structure, such as the internal elements 101, in the real environment. The reflected light from the physical structure is captured by the detector, generating a point cloud associated with the physical structure by determining phase shift or "time-of-flight." In an embodiment, the points can be mapped out in space based on the laser's time of flight. The scanner's range finder determines the object's distance by timing the light pulse's round-trip. This is given by the equation: $d=(c*t)/2$ where d is distance, c is speed of light, and t is round-trip time. Each point in the point cloud indicates a location of a corresponding point on a surface of the physical structure.

In order to position the point clouds accurately in an environment's coordinate system and align the point clouds, targets can be used to tie the clouds together. The targets can be placed on the control points (e.g., used during surveying) so that points in the cloud are assigned coordinates (horizontal and vertical coordinates). Two to three targets are typically needed for each scanner setup to accurately establish the point cloud's location in the coordinate system. Typically, multiple point clouds are stitched together during registration. From the point clouds, 3D digital models of surveyed and scanned elements can be created accurately to within one-eighth of an inch.

Referring to FIG. 1, the system 100 also includes a server computer 120. The server computer 120 can include a 3D modeling module 122, an augmented reality ("AR") module 124, a data storage 126, and a data processor 127. A module can include hardware, software, or a combination of thereof, which performs a set of functions. While the 3D modeling module 122 and the AR module 124 are illustrated as separate modules, they can be integrated into a single module. In addition, there are a number of other components (e.g., memory, input/output module, or the like) in the server computer 120 which are not illustrated in FIG. 1.

The 3D modeling module 122 can include computer-aided design software, such as AutoCAD™, which can be used to generate a 3D digital model (e.g., 3D solids) of the internal elements 101 and/or the external element 102. A 3D digital model refers to a three dimensional representation of an element or object in a digital format which can be viewed on a computer screen or other electronic devices. In one embodiment, the point clouds obtained from a 3D laser scanner can be imported into the 3D digital modeling module 122 and processed by the data processor 127 to be traced over when constructing a 3D digital model. A 3D digital model in accordance with the present invention is an intelligent model—it contains georeferenced real-world coordinates (e.g., coordinate data) for any point on the 3D digital model. In other words, any location on or around the 3D digital model can be clicked and selected in the 3D modeling module 112 to obtain real-world coordinates associated with the location. The 3D digital model of the internal elements 101 can be stored in the data storage 126 of the server computer120, uploaded to a third party AR software server (not shown in FIG. 1), or transmitted to the mobile device 140 for storage.

The server computer 120 can also include an AR module 124. The AR module 124 can be a software application that can run on a number of different platforms. While the AR module 124 is shown as part of the server computer 120, it can be included in a mobile device 140, and its functions can be performed entirely or partly by the mobile device 140 depending on the memory and the processing power of the mobile device 140. In an embodiment, any suitable commercially available augmented reality software can be modified and applied in embodiments of the present invention. For example, AR softwares from ShowCase™, Metaio™, Augment™, or any other suitable AR software applications can be modified and customized for augmented reality visualization according to embodiments of the present invention.

The AR module 124 can also be used to associate a 3D digital model of the internal elements with a selected marker so that the 3D digital model can be displayed as a virtual object overlaid in relation to a position, orientation, and size of a marker in the real environment using a mobile device. In an embodiment, a marker can have a two or three dimensional image or a graphic design with marking elements with a unique pattern that can be detected and decoded by the mobile device 140. For example, a marker can include a quick response ("QR") code, a Universal Product Code ("UPC") code, a bar code, a painting, a photograph, or any other suitable images. In an embodiment, the marker can be printed on a sign or etched into the external element, such as concrete on-site. In another embodiment, the marker displayed onscreen (e.g., a television monitor attached to the finished wall) in the real environment can be used for AR visualization of internal elements. In some embodiments, a marker can include marking elements that can be camouflauged and blended with the real environment for aesthetics. In yet another embodiment, the marking elements can be two-dimensional or three-dimensional.

In embodiments of the present invention, a marker which is in the digital environment (e.g., shown on the computer screen) can be referred to as a digital marker, and the marker which is provided in the real, physical environment can be referred to as a physical marker (e.g., printed on paper). A physical marker that corresponds to a digital marker has the same marking elements as the digital marker. The marker 103 can be placed at precise, surveyed coordinates on the external element in the real environment using the surveying equipment 112. Thus, the marker placed on the external element 102 can be used as an anchor point for augmented reality visualization of the 3D digital model of the internal elements 101

Referring to FIG. 1, the system 100 also includes the mobile device 140 which can be used to detect the marker 103 in the real environment and to view an augmented reality image. Examples of the mobile device 140 include any handheld computing device, such as a smartphone, a tablet computer, a gaming device, or a wearable device, such as glasses, or a combination thereof. As shown in FIG. 1, the mobile device 140 has a number of components, including a camera 141, which can be used to detect and capture an image of the marker 103. Any real scenes seen through the camera and/or any images retrieved from a data storage 147 (or retrieved from the server computer 120 or a third party AR server) can be processed by a data processor 148 and displayed on a display screen 145 of the mobile device 140. User input device 146 can include buttons, keys, or a touch screen display which can receive user input.

The mobile device 140 also includes a computer-readable storage medium 144 which has an AR application 143. The AR application 143 can run on the mobile device to initiate and faciliate AR processing so that a user can visualize 3D augmented reality scenes on the display screen 145. In an embodiment, any suitable commercially available augmented reality software can be modified and applied in embodiments of the present invention. For example, AR softwares from ShowCase™, Metaio™, Augment™, or any other suitable AR software applications can be modified and customized for augmented reality visualization according to embodiments of the present invention.

An AR application in accordance with embodiments of the present invention can include a plurality of instructions, which when executed by the processor, allows a user to visualize the real environment seen through the camera of the mobile device and retrieved 3D digital models at the same time. For example, the plurality of instructions include instructions that cause the processor to detect, using the camera of a mobile device, a marker placed on an external element in the real environment. The marker is placed at a predetermined set of coordinates associated with one or more marker point locations on the external element determined by surveying equipment at a calculated distance in depth in front of the internal elements, which are hidden behind the external element. The plurality of instructions also includes instructions that cause the processor to analyze the image of the marker to determine a 3D digital model of the internal elements associated with the marker. The plurality of instructions further includes instructions that cause the processor to retrieve, from data storage, a data file comprising the 3D digital model associated with the marker and relation data between the 3D digital model and the marker. The plurality of instructions further includes instructions that cause the processor to provide, on a display screen of the mobile device, an augmented reality image comprising a real view of the external element seen through the camera in real-time, overlaid with the 3D digital model of the internal elements in relation to the marker according to the relation data. This results in the 3D digital model of the internal elements being displayed in a geometrically correct orientation with respect to the external element at a calculated distance in depth as they would exist in the real environment.

In addition, the mobile device 140 can include one or more sensors 142, such as a GPS device, a gyroscope, and an accelerometer. In one implementation, one or more sensors can be used to position and track a 3D digital model relative to the user. For example, the gyroscope and accelerometer can be used to calculate the elevation and distance between the marker 103 and the mobile device 140 in order to rotate, scale, and skew the 3D digital model to the appropriate perspective in the real-world view shown on the display screen 145. In another implementation, matrix transformation techniques can be used, in addition or alternative to sensors, in order to rotate, scale, and skew the 3D digital model to the appropriate perspective in the real-world view shown on the display screen. Other variations, modifications, and alternatives to adjusting the 3D digital model to appropriate perspectives relative to the device position and orientation can be used in embodiments of the present invention.

Figure 2:
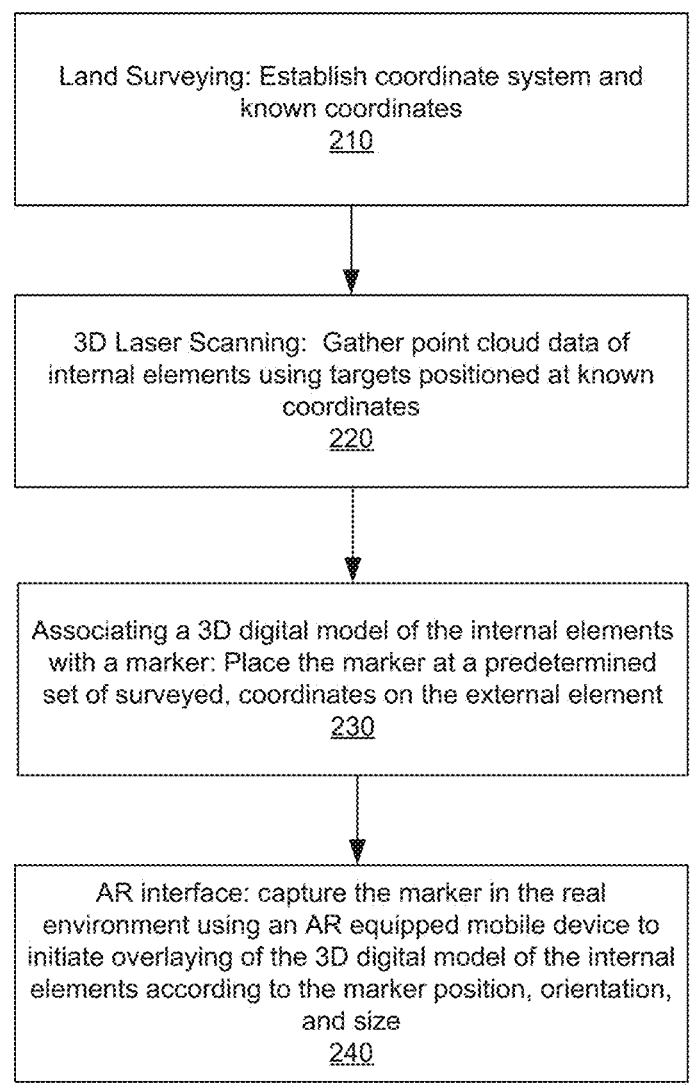
FIG. 2 shows a flow diagram illustrating a method of providing coordinate geometry augmented reality according to an embodiment of the invention.

FIG. 2 shows a flowchart illustrating an exemplary, broad overview of coordinate geometry processing to augmented reality processing according to an embodiment of the invention. In step (210), land surveying is performed to establish a coordinate system and known coordinates using surveying equipment. In step (220), with control target points positioned at known coordinates, the 3D laser scanning is performed, using a 3D laser scanner, on the internal elements 101 in the real environment to gather point cloud data associated with the internal elements 101. In step (230), a 3D digital model of the internal elements generated from the point cloud data is associated with a marker in an AR module so that the 3D digital model is set at a calculated distance in depth behind the marker. In step (230), the marker (i.e., a physical marker) is also placed at a predetermined set of surveyed, coordinates on the external element in the real environment. In step (240), an AR interface is provided by a mobile device running an AR application. When the marker placed on the external element in the real environment is captured and decoded by the mobile device, the 3D digital model associated with the marker is retrieved and displayed on the display screen of the mobile device together with the real scenes seen through a camera of the mobile device. In embodiments of the present invention, the 3D digital model of the internal elements is displayed in a geometrically correct orientation with respect to the external element seen through the camera of the mobile device in real-time.

It should be appreciated that the specific steps illustrated in FIG. 2 provides a particular method of coordinate geometry processing to augmented reality processing according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3A:
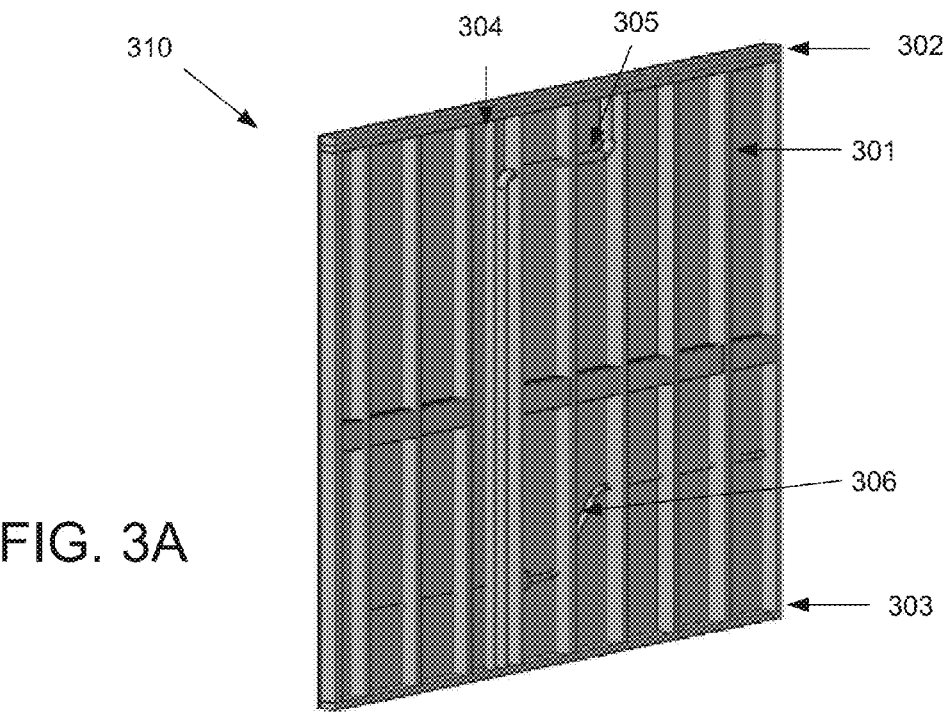
FIGS. 3A-3E shows an exemplary embodiment of internal elements and an external element according to an embodiment of the present invention.
Figure 3B:
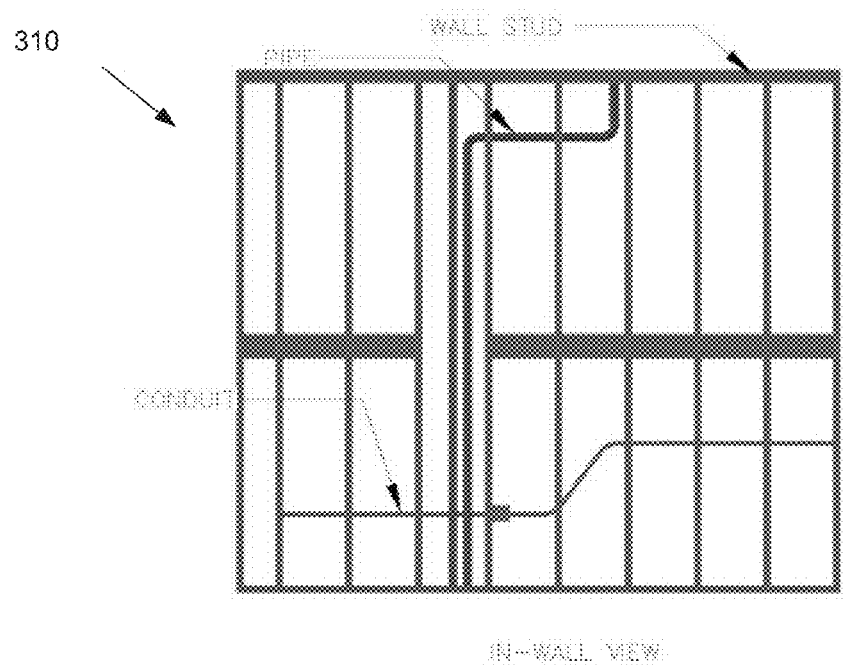

FIGS. 3A through 3D illustrate various views of exemplary internal elements and an external element as they exist in the real environment. FIG. 3A illustrates a perspective view of internal elements 310. The internal elements shown in FIG. 3A are in-wall elements, which include wall studs 301, a top plate 302, a bottom plate 303, pipes 304 and 305, and a conduit 306. FIG. 3B illustrates a front view of the internal elements 310 that are exposed prior to being covered by a finished wall (i.e., an external element).

Figure 3C:
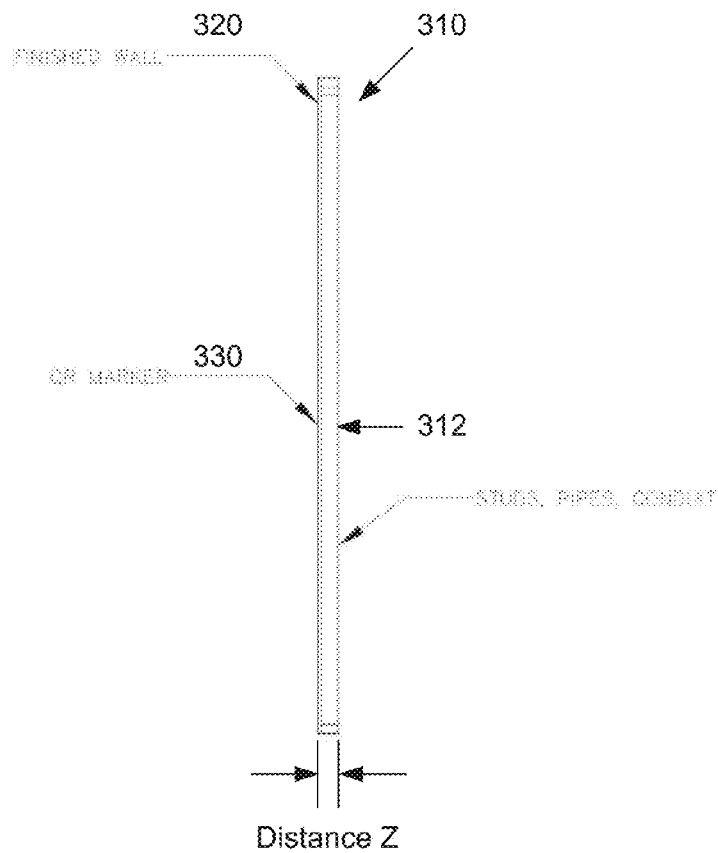
Figure 3D:
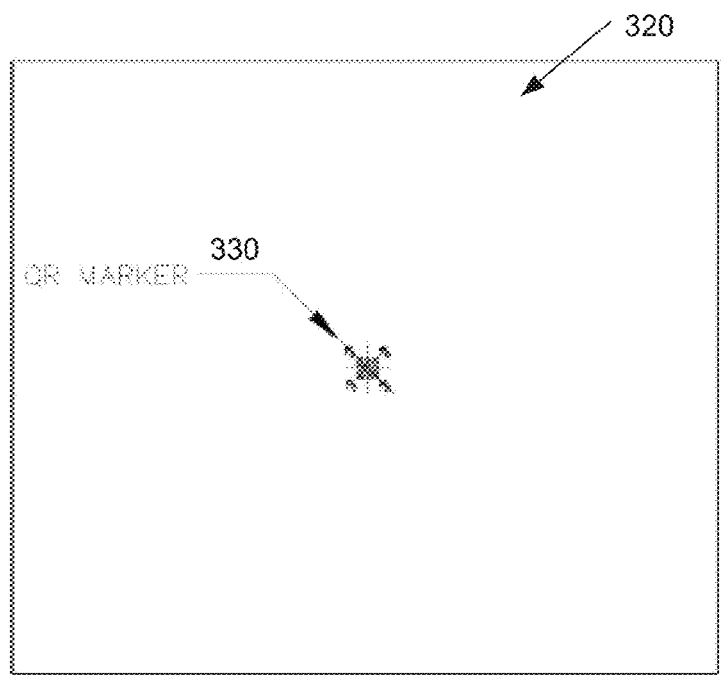

FIG. 3C illustrates a side view of a finished wall 320 and internal elements 310 together. FIG. 3D illustrates a front view of the finished wall 320 after the finished wall 320 covers and conceals the internal elements 310. As shown in FIG. 3C, the internal elements 310 (e.g., the center of mass of the internal element 312) is set at distance Z behind the surface of the finished wall 320. As discussed in detail below in relation to FIGS. 4A-4C, a marker 330 can be placed at any suitable location, for example, at the center of the finished wall 320 for augmented reality visualization of the 3D digital model of the internal elements 310. In an embodiment, the marker 330 is associated with a 3D digital model of the internal elements 330 in terms of their position, orientation, and size in the AR module of the server computer.

Figure 3E:
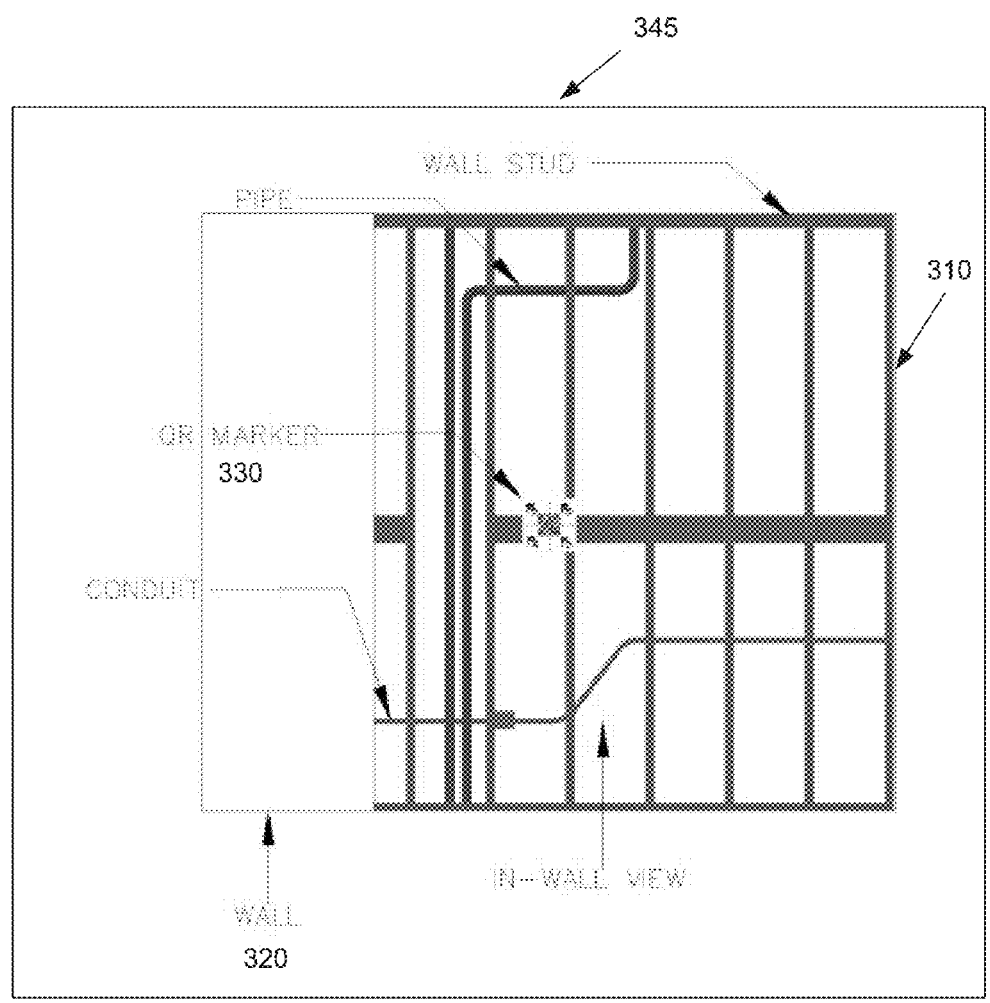

FIG. 3E illustrates a schematic diagram representing an augmented reality image shown on a display screen 345 of a mobile device. The augmented reality image comprises a real, live view of the finished wall 320 with the marker 330 placed at the center of the finished wall seen through a camera of the mobile device. When the mobile device detects the marker 330 attached to the finished wall 320, the mobile device decodes the marker and retrieves a 3D digital model of a selected portion of the internal elements 310 associated with the marker 330. As shown in FIG. 3E, the 3D digital model of the internal elements 310 is displayed according to the position, orientation, and size of the marker 330. While FIG. 3E displays a front view of the augmented reality image, as the user changes the angle of the mobile device camera with respect to the finished wall, the 3D digital model of the internal elements can be seen by the user as if it were set back behind the finished wall by distance Z as-built in the real environment.

Figure 4B:
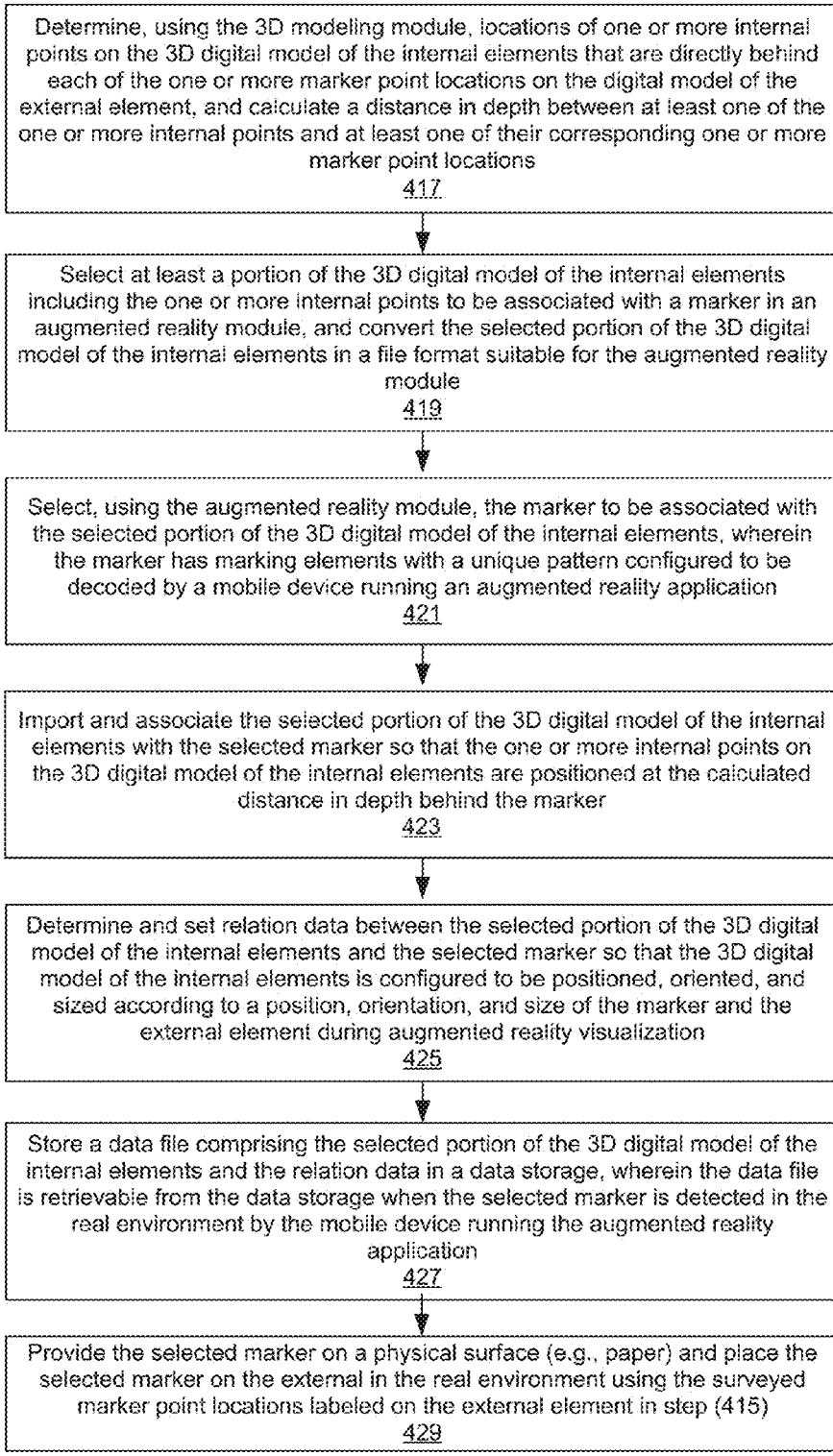

FIGS. 4A and 4B show a flowchart illustrating a method for land surveying, 3D laser scanning, 3D digital modeling, and associating a marker with a digital model according to an embodiment of the present invention. Each step shown in FIGS. 4A and 4B is also illustrated in FIG. 1 with references to system components associated with each step in the flowchart.

In the embodiment illustrated in FIG. 4A, the surveying and laser scanning processes are performed at important milestones during a construction project. For example, internal elements (e.g., pipes, conduits, wall studs, etc.) in a building are surveyed using surveying equipment and 3D laser scanned when they are installed, but prior to being covered up by an external element (e.g., sheetrock). After the project has been completed, the external element (e.g., finished wall or ceiling) is surveyed again using the surveying equipment after the internal elements are covered by the external element.

There are advantages to this two-step process. Accurate visuals and locations of internal elements, as built, can be obtained before they are concealed behind an external element. Although a blueprint of a building may be available, internal elements are often not installed as indicated on the blueprint. When contractors of different trades (e.g., plumbers, electricians, etc.) install their internal elements in tight spaces, such as between walls, above ceilings, or behind any external elements, they may make impromptu modifications and deviate from the blueprint. In embodiments of the present invention, by surveying and laser scanning the project site at different time points as it is being built, an accurate 3D digital model of the internal elements as built can be generated.

Referring to FIG. 4A, in step (401), the surveying equipment 112 can be used to survey a project site with internal elements 101 in a real environment (e.g., a room in a building) while the internal elements are still exposed and visible. During a surveying process, targets can be placed on control points on or around the internal elements 101, and the coordinates of the control points can be determined in relation to a real-world coordinate system. For example, each control point can be defined in terms of "Northing, Easting, Elevation" based on a selected real-world coordinate system.

In step (403), the internal elements 101 in the real environment can be scanned using the 3D laser scanner 114 with the same targets positioned on the control points as during surveying in step (401) to obtain point cloud data associated with the internal elements 101. Thus, the entire point cloud can be tied to the surveyed control points. The point cloud data outlines contours of the internal elements and provides information related to various geometric parameters associated with the internal elements 101. These include dimensions and angles of various portions of the internal elements in relation to one another and to the surveyed target control points. In addition, any position in the point cloud data associated with the internal elements can be assigned coordinates in relation to the real-world coordinate system based on the known coordinates of the surveyed target control points.

In step (405), the point cloud data associated with the internal elements 101 and the coordinates of the control targets can be provided to the server computer 120 for 3D modeling of the internal elements 101 via any suitable communication medium. Using the point cloud data, the 3D modeling module 122 in the server computer 120 can generate a 3D digital model of the internal elements 101 to be visualized on a screen of a computer or other electronic devices. Once the 3D digital model of the internal elements is generated based on the point cloud data, the dimensionally correct internal elements can be viewed from any perspective within the virtual 3D environment. In an embodiment, the 3D digital model of the internal elements may only include certain features, such as structural elements, while others include all mechanical, electrical, and plumbing modeled in their correct location, orientation, and scales. In another embodiment, features of the internal elements can be color-coded according to desired specifications.

Since each point in the point cloud data can be assigned coordinates (e.g., Northing, Easting, and Elevation) in a real-world coordinate system, the 3D digital model of the internal elements is embedded with coordinate data in relation to the real-world coordinate system. For example, any point on the surface of the 3D digital model of the internal elements can be clicked and selected by the user to obtain coordinates of the selected point. Since the 3D digital model of the internal elements is produced using accurately surveyed and scanned geometric and coordinate data, the geometric and coordinate data (e.g., dimensions, angles, coordinates, or the like) of the digital model displayed on a computer screen is generally within ⅛ of an inch of actual, real-life parameters of the internal elements 101 with at least a 95 percent confidence level.

After the internal elements are covered by an external element, the external element is surveyed, using the surveying equipment, with one or more targets positioned at a second set of control points on the external element to determine their coordinates in relation to the real-world coordinate system (407). The surveyed target control points on the external element and their coordinates are imported into the 3D modeling module. Then, they are tied in with the 3D model of the internal elements in terms of their positions so that they co-exist in the same real-world coordinate system (409). Upon tying the external and internal elements together, the relative location and orientation of the external element with respect to the internal elements can be determined.

In addition to surveying, the external element can also be laser scanned with a 3D laser scanner if desired. While surveying the external element with the surveying equipment is generally sufficient to determine its location and orientation relative to the internal elements, the external element can also be laser scanned to generate point clouds associated with the external element if it has interesting features or an uneven surface. From the generated point cloud data associated with the external element, the 3D digital model of the external element can be generated.

Referring to FIG. 4A, in the 3D modeling module, a digital model of the external element can be generated and positioned in front of the 3D digital model of the internal elements using the determined coordinates of the surveyed target control points on the external element (411). Alternatively, if the external element is also laser scanned, the 3D digital model of the external element can be generated using the point cloud data associated with the external element. Through bringing in the digital models of the internal and external elements together using the same coordinate system, they can be displayed onscreen as-built in the real environment.

In step (413), in the 3D modeling module, one or more marker point locations are selected on the digital model of the external element for positioning and orienting a marker in the real environment for augmented reality visualization. The marker point locations can also be used to associate a selected marker with their corresponding internal points located on the 3D digital model of the internal elements so that the 3D digital model of the internal elements can be overlaid on the live view of the mobile device, perfectly aligned to the orientation and scale of the scene based on the marker position and orientation even if the user moves around. These steps are described graphically below in further detail in relation to FIGS. 5A through 5E.

In step (415), the coordinates (e.g., Northing, Easting, and Elevation) associated with the one or more marker point locations can be extracted from the 3D modeling module. The extracted coordinates are inputted into the surveying equipment 112 to determine the locations of these marker point locations on the external element in the real environment (415). Thereafter, the locations of the surveyed marker points can be labeled, for example, with a "+," on the external element in the real environment to assist placing a physical marker on the external element in the real environment.

Referring to FIG. 4B, the method includes determining, using the 3D modeling module, locations of one or more internal points on the 3D digital model of the internal elements that are directly behind each of the one or more marker point locations on the digital model of the external element (417). An internal point on the 3D digital model of the internal elements can be referred as being "directly behind" a marker point location on the digital model of the external element when a line drawn between the internal point to the marker point location is perpendicular to the plane of the external element. In embodiments of the present invention, the distance between each of the one or more marker point locations and their corresponding internal points on the 3D digital model of the internal elements can be calculated. The calculated distance reflects the depth of the internal elements (e.g., the center of mass of the 3D digital model of the internal elements) in relation to the external element (e.g., a finished wall). The selection of marker point locations on the digital model of the external element, internal points on the 3D digital model of the internal elements, and distance calculations are described below in further detail in relation to FIGS. 5A through 5E.

In step (419), the method includes selecting at least a portion of the 3D digital model of the internal elements (including the one or more internal points) to be associated with a marker in an AR module so that the selected portion of the 3D digital model can be visualized in real scenes on a mobile device during augmented reality process. In an embodiment, if the AR module does not accept a file format of the 3D modeling software, then the 3D digital model can be converted using 3ds Max™ or other suitable surface texturing software so that it can be used in the AR module. If the AR module accepts a file format of the 3D modeling module, such as AutoCAD™, then this step may be omitted.

In embodiments of the present invention, any desired portion of the 3D digital model of the internal elements can be selected. For example, the entire 3D digital model of the internal elements can be selected so that the entire internal elements can be visualized at once. In another embodiment where the internal elements are dimensionally too large or long (e.g., continuous underground pipes) to be visualized at once on the mobile device display screen from a reasonable distance, a portion of the 3D digital model of the internal elements can be selected for augmented reality visualization. For example, a selected portion of the digital model of the internal elements may include an area of interest, such as a coupling joint for pipes to be upgraded. Each portion of the 3D digital model of the internal elements can be associated with a different marker so that when a particular marker is detected by the mobile device, a corresponding portion of the 3D digital model of the internal elements can be retrieved on a display screen for augmented reality visualization.

In step (421), the method includes selecting a marker to be associated with the selected portion of the 3D digital model of the internal elements in the AR module. The marker has marking elements with a unique pattern configured to be decoded by the mobile device to retrieve a 3D digital model of the internal elements associated with the marker, which, when detected by the mobile device, is decoded to retrieve the 3D digital model. In an embodiment, the AR module 124 in the server computer 120 can generate and provide a number of different markers from which the user can select. Alternatively, an image of the marker with marking elements can be imported from other sources to be used as a marker. The marker also has marker points at specific locations of the marker, which correspond to their respective marker point locations on the digital model of the external element shown in FIG. 5A.

In step (423), the selected portion of the 3D digital model of the internal elements in a suitable file format from step (419) is imported into the AR module and is associated with a selected marker. Association can refer to matching a particular 3D digital model of the internal elements with a selected marker so that when the marker in the real environment is detected and decoded by the mobile device, the associated 3D digital model is retrieved for augmented reality visualization. Additionally, association may further include setting a positional, orientation, and scale relationship between the selected portion of the 3D digital model of the internal elements and the selected marker. The relation data (e.g., position, orientation, and scale) between the 3D digital model of the internal elements and the selected marker can be determined and set in the AR module (425). For example, in the AR module, the internal points on the 3D digital model of the internal elements are positioned directly behind their corresponding marker points on the marker at a depth distance calculated in step (417). This way, when the marker is detected by the mobile device, the associated 3D digital model of the internal elements retrieved by the mobile device can be properly positioned, oriented, and scaled based on the position, orientation, and size of the selected marker during augmented reality visualization. These steps are described more in detail below with references to FIGS. 5A through 5E.

In step (427), the method includes storing a data file that includes the selected portion of the 3D digital model of the internal elements and the relation data between the digital model and the selected marker in data storage. The data file is retrievable from the data storage when the selected marker is detected in the real environment by the mobile device running an augmented reality application. In some embodiments, the data file may further include supplemental content associated with a 3D digital model. Examples of supplemental content may include additional building information model ("BIM") about the internal elements. For instance, the supplemental content may include identification of each internal element (e.g., a drainage pipe, a water pipe, an electrical conduit, or the like), construction materials used for the internal elements, manufacture information associated the internal elements, dimensions of the internal elements, or the like. In another embodiment, the supplemental content may include a maintenance schedule related to the internal elements. The supplemental content may further include a recommended viewing angle or distance to view an augmented reality image using the mobile device 140 on the project site. The supplemental content may be animated, auditory, visual, or a combination thereof, and different information layers of supplemental content can be selected by the user on a touch screen display of the mobile device for visualization.

The data file can be stored in the data storage 126 of the server computer 120 and/or stored in a third party site (e.g., an AR software server). The data file may also be transmitted to the mobile device 140 for local storage. Storing the data on the mobile device may be useful in some situations because accessing a server computer or a third party server may require a WiFi or cellular signal which can be difficult at remote plant locations or inside large buildings.

In step (429), the selected marker associated with the 3D digital model of the internal elements can be provided on a physical surface (e.g., printed on paper), and the marker can be placed on the external element in the real environment using the surveyed marker point locations labeled on the external element. For example, the center point of the marker can be affixed to the center marker point location labeled on the external element determined in step (415). Other surveyed marker point locations on the external element can also be used to align the marker in a correct orientation. Since the coordinates for marker points are determined by the surveying equipment, the marker (e.g., the center point of the marker) can be placed within about ⅛" (⅛ of an inch or 1/100 of a foot) accuracy of the actual coordinates in a real-world coordinate system with at least a 95 percent confidence level. The accurate placement of the marker in the real environment results in a more accurate visualization of the 3D digital model of the internal elements 101 with respect to the external element 102 in an augmented reality image viewed through the mobile device 140

It should be appreciated that the specific steps illustrated in FIGS. 4A and 4B provide a particular method of surveying, laser scanning, 3D modeling, and associating a marker with a 3D digital model according to an embodiment of the present invention. Other sequences of steps may also be performed according to alternative embodiments. Alternative embodiments of the present invention may perform the steps outlined above in a different order. Moreover, the individual steps illustrated in FIGS. 4A and 4B may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 5A through 5E illustrate an exemplary embodiment graphically illustrating selection of marker point locations in a 3D modeling module, selection of a marker in an AR module, and association of the 3D digital model of the internal elements with the selected marker in accordance with embodiments of the present invention.

Figure 5A:
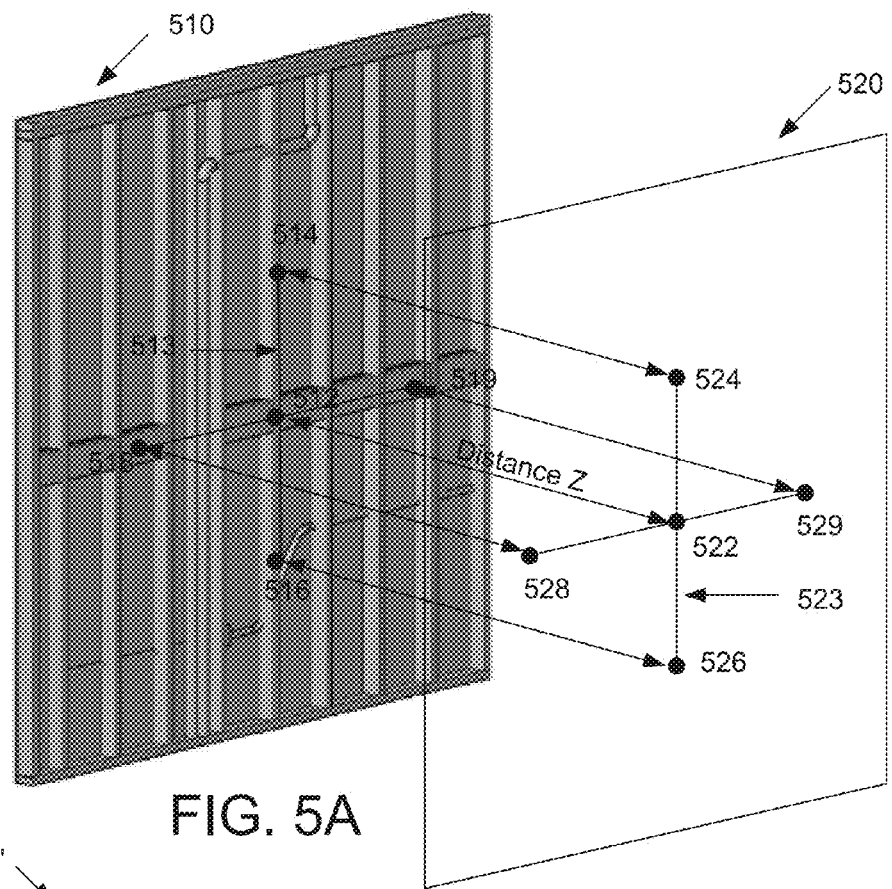
FIGS. 5A-5E show association of a 3D digital model of internal elements with a marker according to an embodiment of the present invention.

The selection of marker point locations in step (413) can be illustrated graphically using an exemplary embodiment shown in FIG. 5A. FIG. 5A illustrates a 3D digital model of internal elements 510 and a digital model of a finished wall 520 (i.e., external element), which are generated using the 3D modeling module. The marker point locations 522, 524, 526, 528, and 529 are selected on the digital model of the finished wall 520. These marker point locations on the digital model of the external element 520 can be used to associate a marker having corresponding marker points with the 3D digital model of the internal elements 510. In the embodiment illustrated in FIG. 5A, the center marker point location 522 is located at the center of the digital model of the finished wall 520. Other marker point locations 524, 526, 528, and 529 are selected such that a perpendicular cross-hair 523 can be drawn using the five marker point locations as shown in FIG. 5A. The coordinates associated with these marker point locations can be used to position and orient the marker in the real environment. These marker point locations and/or the cross-hair can also be used to set the positional and orientation relationship between a selected marker and a 3D digital model of the internal elements.

Figure 5B:
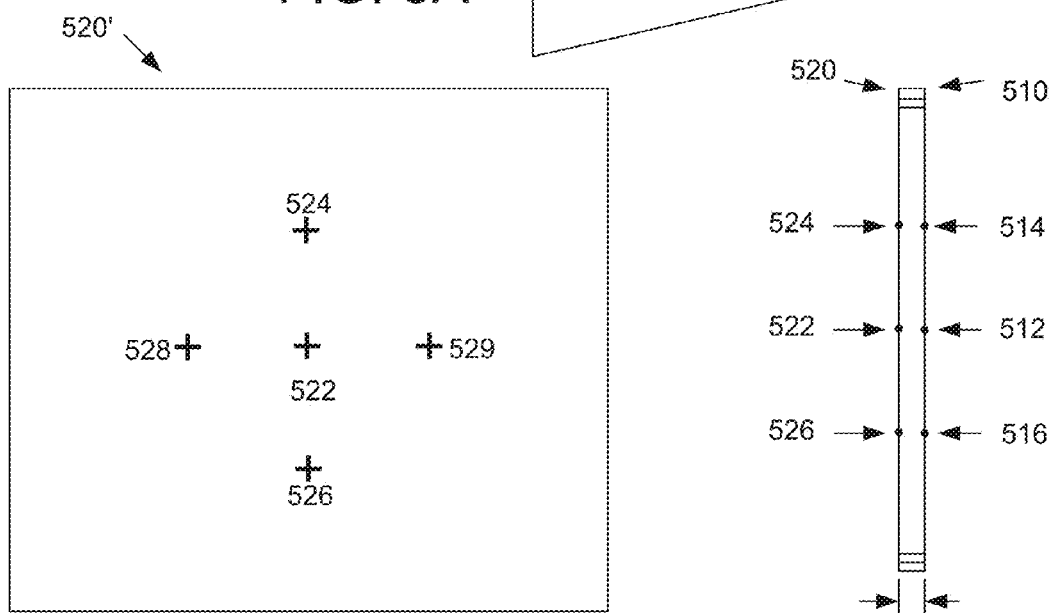

The real world locations of marker point locations on the finished wall can be determined through surveying. The coordinates of the marker point locations (e.g., Northing, Easting, and Elevation) can be extracted by clicking on these marker point locations on the digital model of the external element 520 in the 3D modeling module. The extracted coordinates can be provided to surveying equipment to determine these coordinates on the finished wall in the real environment. FIG. 5B illustrates a schematic diagram illustrating the finished wall 520' in the real environment. The five points labeled by "+," represent the locations of the extracted coordinates associated with the marker point locations on the finished wall 520' in the real environment. These five points labeled by "+" sign can be used later to position and orient a selected marker in the real environment, where each of the marker points of the marker can be aligned with its corresponding marker point locations labeled on the external element 520'.

Referring to FIG. 5A, internal points on the 3D digital model of the internal element 510 that are directly behind each of the marker point locations 522, 524, 526, 528, and 529 are determined. For example, the internal point 512, which is the center of the mass of the 3D digital model of the internal element 510, is directly behind the center marker point location 522 on the digital model of the finished wall 520. In other words, a line drawn between the internal point 512 and the center marker point location 522 is perpendicular to the plane of the finished wall 520 and to the plane of the internal elements 510. Similarly, each of the internal points 514, 516, 518, and 519, which are directly behind each of the corresponding marker point locations 524, 526, 528, and 529 is determined. These internal points, like the marker point locations, form a perpendicular cross-hair 513. These internal points and/or the cross-hair 513 can be used to orient the 3D digital model of the internal elements in a geometrically correct orientation with a selected marker, which in turn, will be positioned and oriented correctly with respect to the labeled locations on the finished wall in the real environment shown in FIG. 5B.

Figure 5C:
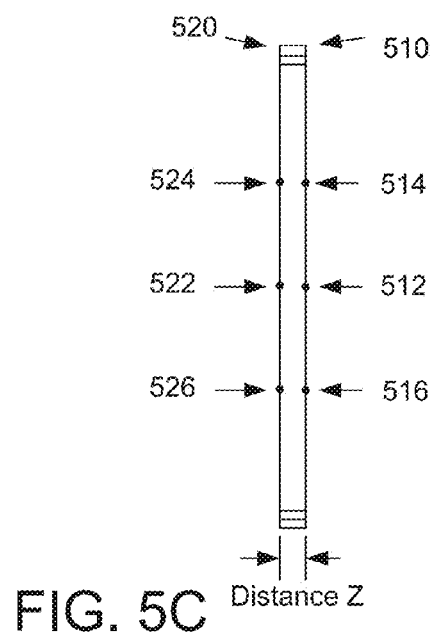

FIG. 5C illustrates a side view of the 3D digital model of the internal elements 510 combined together with the digital model of the finished wall 520 when the combined digital model is sliced at the center vertically. As shown in FIG. 5C, the 3D digital model of the internal elements includes the center internal point 512 (e.g., the center of mass), and two additional internal points 514 and 516. These internal points are directly behind (i.e., perpendicular) to the center marker point location 522, and additional marker point locations 524 and 526, respectively. In the embodiment shown in FIG. 5C, the digital model of the finished wall 520 is set at distance Z in front of the 3D digital model of the internal elements (e.g., the center of mass). This relative distance in depth between a marker point location and its corresponding internal point can be calculated in the 3D modeling module, such as AutoCAD™, so that a marker selected in the AR module can be set at the same calculated distance in front of the 3D digital model of the internal elements. If the vertical plane of the finished wall and the vertical plane of the internal elements were perfectly parallel, then a distance in depth between each pairs of internal and marker point locations will be the same (i.e., distance Z as shown in FIGS. 5A and 5C). It is noted that distance Z shown in FIGS. 5A and 5E is exaggerated compared to distance Z shown in FIG. 5C for illustrative purposes so that association of internal points and marker point locations (and marker points on the marker) can be illustrated more clearly.

In an alternative embodiment, instead of selecting marker point locations first, internal points (e.g., the center of mass) for the 3D digital model of the internal elements can be selected initially, followed by determining corresponding marker point locations on a digital model of the finished wall. Furthermore, a number of marker point locations and internal points selected are merely exemplary, and any suitable number of marker point locations and internal points can be selected. In either way, the distance in depth between the internal elements and a finished wall can be calculated, and positional and orientation relationship between the 3D digital model of the internal elements and the external element can be determined.

Figure 5D:
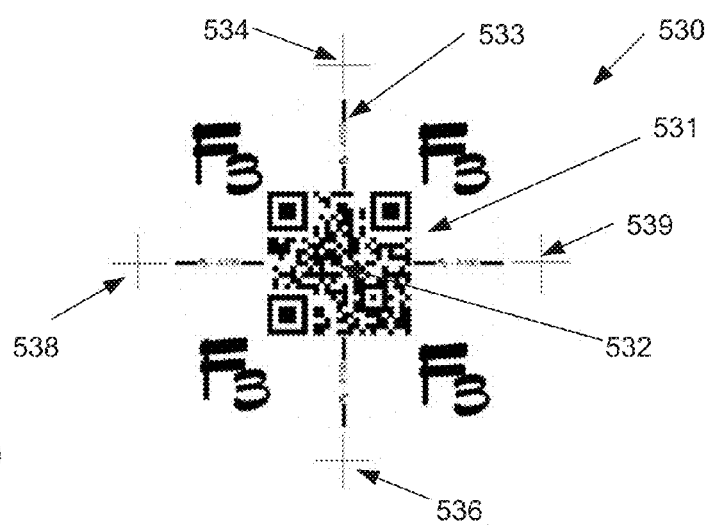

FIG. 5D illustrates a marker 530 that is selected in the AR module 124 to be associated with the 3D digital model of the internal elements 510. The marker 530 includes a QR code 531, which can code information including the location of a data file storing a 3D digital model for retrieval, relation data, or the like. The marker 530 has a center marker point 532 at the center of the QR code 531. The digital marker 530 has four additional marker points 534, 536, 538, and 539 (i.e., the center of "+" shown in FIG. 5D) surrounding the center marker point 532. A cross-hair 533 can be formed by drawing a line through points 534, 532, and 536, and a line through points 538, 532, and 539. The cross-hair 533 provides two bearings perpendicular to each other. In an embodiment, the two bearings of the cross-hair 533 can be used to orient the 3D digital model of the internal elements with respect to the marker during augmented reality visualization. The marker 530 printed on a physical surface will be later fixed to the finished wall 520' in the real environment such that the center marker point 532 is fixed to the center marker point location 522 of the finished wall, and the cross-hair 533 of the marker is aligned with the cross-hair formed by the surveyed marker point locations shown in FIG. 5B. Alternatively, each of the marker points on the marker 530 printed on a physical surface can be attached to each of their corresponding marker point locations labeled on the external element 520' shown in FIG. 5B.

Figure 5E:
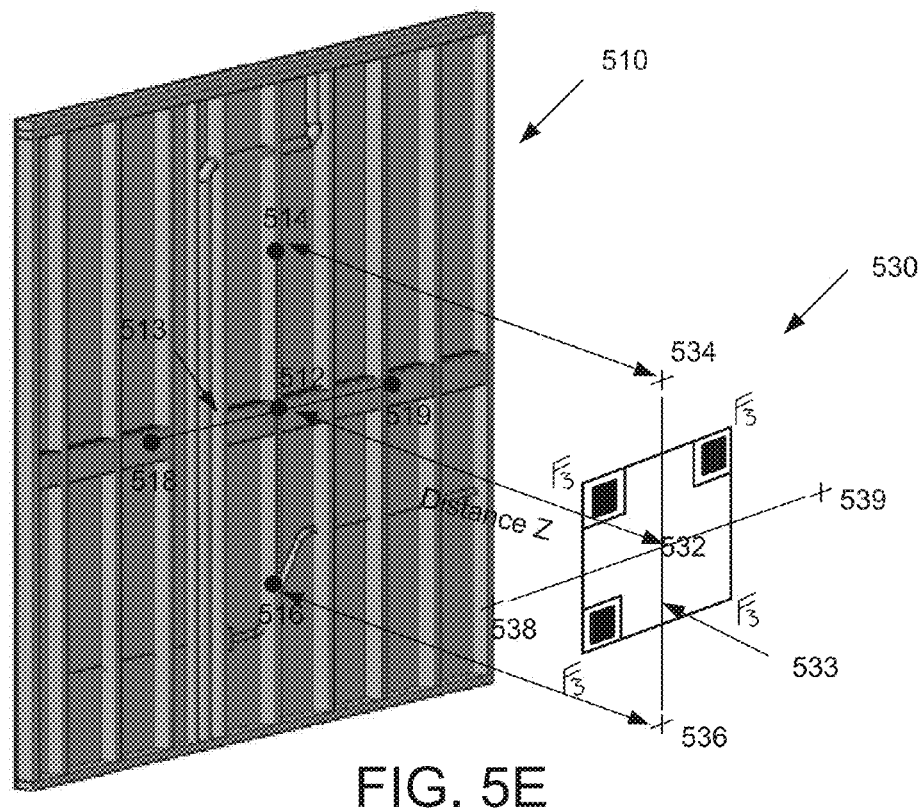

FIG. 5E illustrates association of the 3D digital model of the internal elements with the marker 530 in the AR module accounting the distance Z in depth between the internal elements and the external element. As shown in FIG. 5E, in the AR module, the 3D digital model of the internal elements 510 is associated with the marker 530 such that the center internal point 512 is set at distance Z behind the center marker point 532 of the marker. Similarly, the internal point 518 is set at distance Z behind the marker point 538 of the marker; the internal point 519 is set at distance Z behind the marker point 539 of the marker; the internal point 514 is set at distance Z behind the marker point 534 of the marker; and the internal point 516 is set at distance Z behind the marker point 536 of the marker. Additionally, the cross-hair 533 of the marker 530 is parallel to the cross-hair 513 of the 3D digital model of the internal elements, and a line drawn between the two center points of the cross-hairs are perpendicular to the plane of the marker 530 and to the plane of the internal elements 510. In other words, the 3D digital model of the internal elements 510 has the same positional and orientation relationship with the marker 530 as it does with the marker point locations on the digital model of the external element 520 shown in FIG. 5A.

The association of the 3D digital model of the internal elements 510 with the marker 530 is used when a mobile device running an AR application displays the 3D digital model of the internal element in the real environment. For example, when a mobile device running an AR application detects the marker 530 in the real environment, the mobile device retrieves and displays the 3D digital model of the internal elements 510 such that the center internal point 512 of the 3D digital model of the internal elements 510 is aligned with and set at distance Z behind the center marker point 532 of the physical marker. The cross-hair 511 of the 3D digital model is also aligned with and set at distance Z behind the cross-hair 531 of the physical marker.

In addition, the 3D digital model of the internal elements displayed through the mobile device is scaled based on the size of the marker. In an embodiment, the size of the physical marker determined by the size of the digital marker (in the AR module) in relation to the 3D digital model associated with the digital marker. For example, in the embodiment shown in FIG. 5C, if the distance between the center internal point 512 and the internal point 519 of the 3D digital model of the internal element is X feet, then the distance between the center point 532 and the point 539 of the digital marker is also X feet long. In this example, a physical marker printed based on the digital marker 530 is scaled such that the distance between the center marker point 532 and the marker point 539 on the physical marker is also X feet long. Thus, in embodiments of the present invention, the relation data between the 3D digital model of the internal elements and the digital marker during association can be determined and set such that the 3D digital model is configured to be positioned, oriented, and sized according to a position, orientation, and size of the physical marker in the real environment during augmented reality visualization.

While FIGS. 5A through 5E illustrate associating the center of a marker at the center of the 3D digital model of the internal elements, one of ordinary skill in the art would recognize many variations, modifications, and alternatives. For example, if it is desired to affix a physical marker at a more discrete location (e.g., a corner of a finished wall), then appropriate distance calculations may be performed in associating the offset marker with the 3D digital model of the internal elements so that the 3D digital model of the internal elements can still be visualized at a geometrically correct orientation with respect to the external element. In another example, a physical marker can be placed at a different location, such as on a pedestal in front of the external wall. In this example, an extra distance in depth between the plane of the pedestal and the external wall can be taken into consideration in associating a marker with the 3D digital model of the internal elements.

In addition, while FIG. 5E provides a graphical representation of association of the 3D digital model of the internal elements, the graphical representations are for illustrative purposes and the AR module 124 may not graphically align the 3D digital model of the internal elements with a 3D digital marker. Instead, the locations of internal points associated with the 3D digital model of the internal elements 511 and distance Z or other relative distances may be provided only as numerical values into the AR module for association. Other variations, modifications, and alternatives of associating a marker with a 3D digital model of internal elements are also within the scope of the present invention.

Figure 4C:
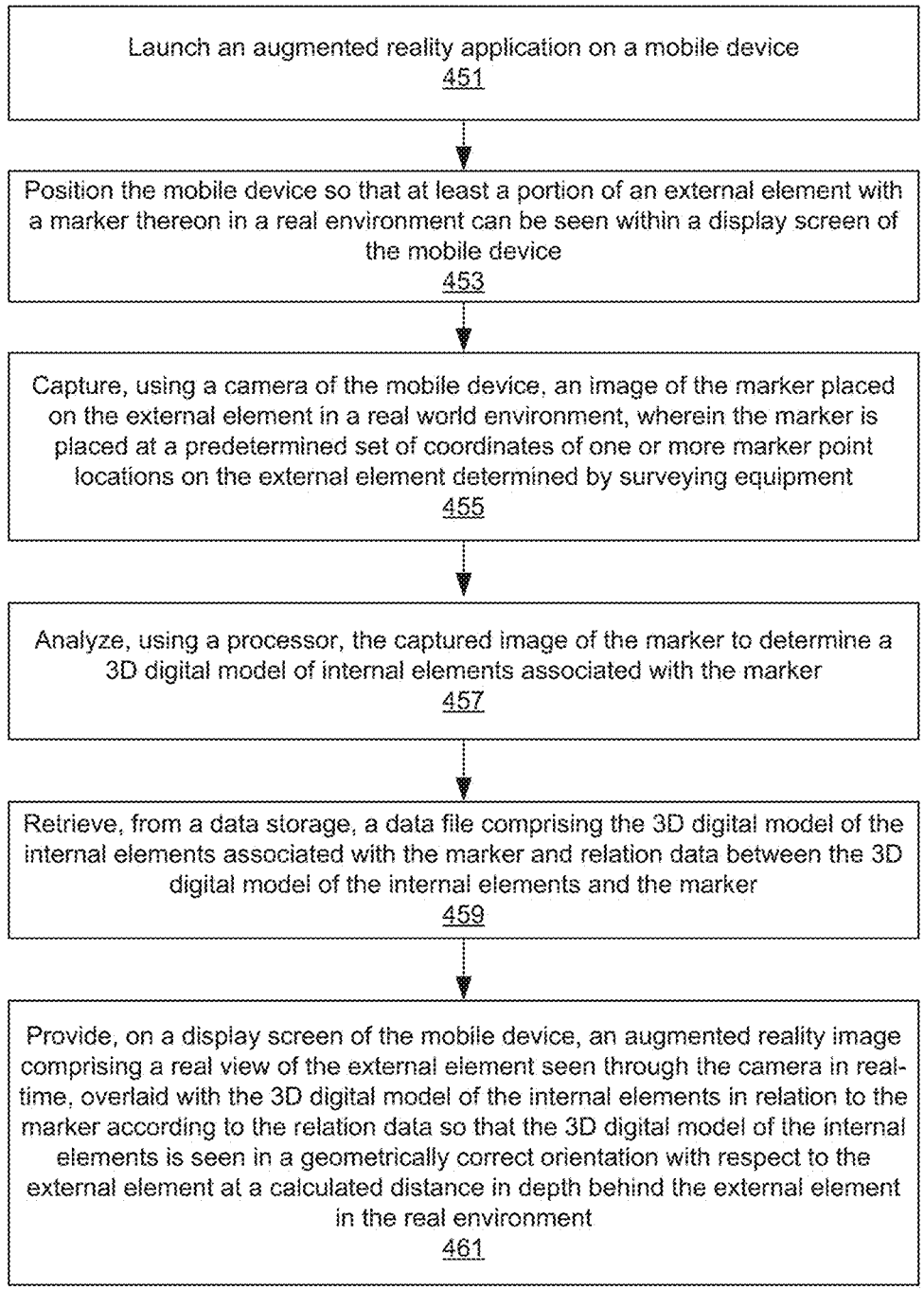

FIG. 4C shows a flowchart illustrating a method of using a mobile device running an augmented reality application to view an augmented image comprising a real view of an external element in real-time overlaid with a 3D digital model according to an embodiment of the present invention. Each step shown in FIG. 4C is also illustrated in FIG. 1 with references to system components associated with each step.

In step (451) of the method, a user launches an augmented reality application on a mobile device 140. The user can position the mobile device 140 so that the external element 102 with the marker 103 thereon can be seen within the display screen of the mobile device 140 in step (453). The user can stand at any suitable distance from the physical marker as long as the physical marker can be detected and decoded by the camera of the mobile device 140.

In step (455) of the method, using the camera 141 of the mobile device 140, an image of the marker 103 placed on the external element in a real environment can be captured. As described above in relation to FIG. 4B, the marker is placed at a predetermined set of coordinates of one or more marker point locations on the external element as determined by surveying equipment. In an embodiment, the center of the marker can be placed at the center of a finished wall, which is directly in front of the center of the mass of the internal elements. In another embodiment, the marker can be fixed at a more discrete location of the external element (e.g., a corner of a finished wall).

In step (457) of the method, the captured image of the physical marker is analyzed, using a processor, to determine a 3D digital model of the internal elements associated with the marker. As discussed above, each marker includes marking elements with a unique pattern that can be decoded for embedded data. In an embodiment, the captured image of the physical marker can be analyzed and decoded by the processor of the mobile device. Alternatively or additionally, the captured image of the marker can be transmitted to the server computer 120 or a third party server for analysis, and the decoded data can be transmitted back to the mobile device 140.

In step (459) of the method, based on the decoded data, a data file comprising the 3D digital model of internal elements associated with the detected marker is retrieved from data storage. Based on the decoded data, the data file can be retrieved from the local data storage 147 of the mobile device 140. Alternatively, a request for a data file comprising the digital model can be transmitted to the server computer 120 or a third party site, and the data file retrieved from remote server storage can be received by the mobile device. Additionally, the relation data between the 3D digital model of the internal elements the marker encoded in the marker can be retrieved.

In step (461), the method includes providing, on the display screen of the mobile device 140, an augmented reality image comprising a real view of the external element in the real environment seen through the camera 141, overlaid with the 3D digital model representing the internal elements. In embodiments of the present invention, the 3D digital model of the internal elements is displayed according to the size, position, and orientation of the marker 103 based on the retrieved relation data. Since the 3D digital model is positioned and oriented based on the location of the physical marker which has been placed at a surveyed set of predetermined coordinates, the 3D digital model of the internal elements is displayed in a geometrically correct orientation with respect to the external element 102 seen through the camera. In other words, the geometric parameters (e.g., dimensions, angles, or the like) of the overlaid 3D digital model (of the internal elements) in relation to the external element 102 seen through the mobile device are same or substantially similar as the geometric parameters of the concealed internal elements as-built in the real environment. In an embodiment of the present invention, the digital model of the internal elements seen through the mobile device display screen may be visualized within ⅛ of an inch accuracy with at least a 95 percent confidence level as they exist in the real environment.

Using the mobile device, a user can walk around the project site and view the augmented reality image from various angles and distances from the physical structure as long as the physical marker can be captured and decoded by the mobile device. As the user walks around the project site or tilts the mobile device, the plane (i.e., physical surface) at which the physical marker 103 is affixed can change its orientation with the camera image plane. In an embodiment, when such a change is detected by the mobile device, a matrix transformation may be performed by the processor of the mobile device, and the scene seen through the mobile device can be adjusted to match the change in the mobile device position and orientation. In addition or in alternative, mobile device sensors may be used to adjust the viewing perspective. This way, the 3D digital model of the internal elements can still be visualized in the geometrically correct orientation with respect to the real scenes as a user moves around. By changing the viewing angle of the 3D digital model of the internal elements, the separation of the internal elements may be better visualized. For example, if the internal elements were pipes underground, then viewing the underground pipes at an angle using a mobile device may allow visualization of separation and stacking of the pipes compared to viewing them straight from the top.

It should be appreciated that the specific steps illustrated in FIG. 4C provides a particular method of overlaying a 3D digital model in a real environment according to an embodiment of the present invention. Other sequences of steps may also be performed according to alternative embodiments. For example, alternative embodiments of the present invention may perform the steps outlined above in a different order. Moreover, the individual steps illustrated in FIG. 4C may include multiple sub-steps that may be performed in various sequences as appropriate to the individual step. Furthermore, additional steps may be added or removed depending on the particular applications. One of ordinary skill in the art would recognize many variations, modifications, and alternatives.

When a project involves a situation where laser scanning internal elements cannot be performed (e.g., the internal elements already covered by an external element), then other available means can be used to construct a 3D digital model of the internal elements. In such a situation, some of the steps shown in FIG. 4A (e.g., steps (401) through (403)) may be omitted, and a flowchart shown in FIG. 6A may be used in generating a 3D digital model of the internal elements.

Figure 6A:
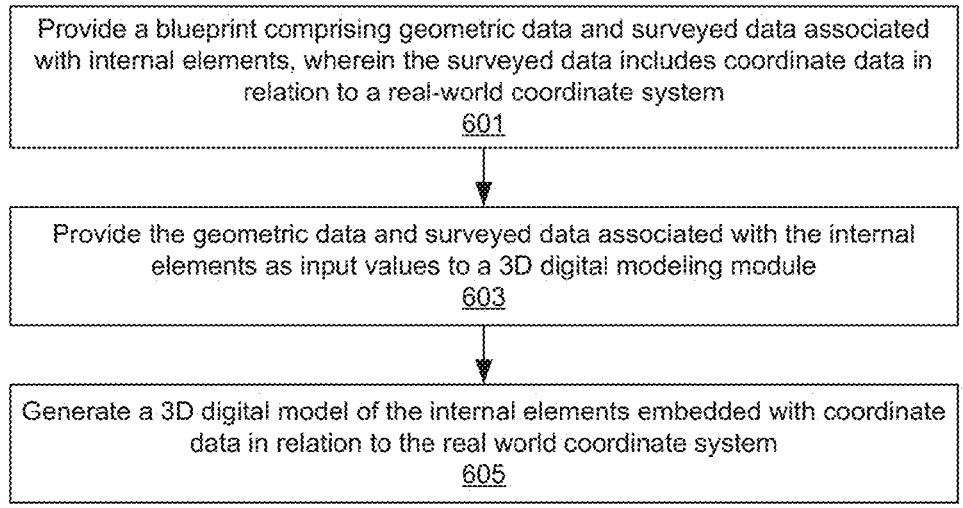
FIGS. 6A and 6B show alternative methods of generating a 3D digital model of internal elements.

Referring to FIG. 6A, an alternative method of generating a 3D digital model of the internal elements includes providing a blueprint comprising geometric data and surveyed data associated with internal elements in step (601). For example, the blueprint may include dimensions and geometric relationships of various portions of internal elements (e.g., diameters and lengths of pipes and conduits). The blueprint may also include surveyed data which includes real-world coordinates (e.g., Northing, Easting, Elevation) associated with a number of points on the internal elements. The blueprint may have been generated at the initial stage of constructing a building or infrastructure, or during renovation of the building or infrastructure. In step (603), the geometric data and the surveyed data from the blueprint can be provided as input values to a 3D digital modeling module, such as AutoCAD™ software. Using these input values, the method includes generating a 3D digital model of the internal elements embedded with coordinate data in relation to the real coordinate system in step (605). After generating the 3D digital model of the internal elements, method steps (starting at step (407)) described in FIGS. 4A and 4B can be utilized to associate the 3D digital model of the internal elements with a marker for augmented reality visualization of the 3D digital model in the real scenes including the external element seen through a camera of a mobile device.

Figure 6B:
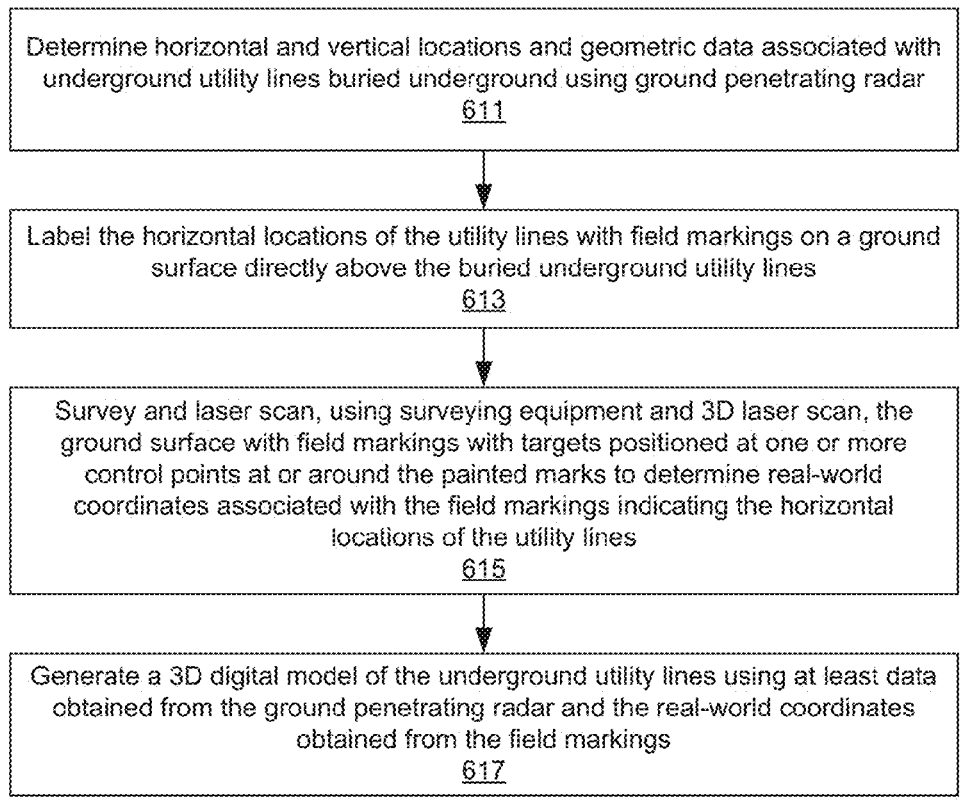

FIG. 6B illustrates another alternative method of generating a 3D digital model of internal elements when the internal elements are underground utility lines, such as gas, water, communication and other utility lines. When a project involves utility lines that are already buried underground, it may be difficult to laser scan the entire utility lines to generate a 3D digital model of the buried utility lines. In such circumstances, other methods can be used to generate a 3D digital model of these underground utility lines embedded with real-world coordinates.

Referring to FIG. 6B, the method includes determining horizontal and vertical locations and geometric data associated with underground utility lines buried underground using ground penetrating radar (611). The ground penetrating radar can determine the depth and outer diameters of various underground utility lines buried under the ground surface. Examples of a ground penetrating radar are described in U.S. Patent Application Publication Nos. 2003/0012411 and 2009/0024326, which are incorporated by reference in their entirety for all purposes. The horizontal locations of detected underground utility lines are labeled with field markings (e.g., paint) on the ground surface (i.e., an external element) directly above the buried underground utility lines (613). For example, the ground surface may be painted in yellow to indicate natural gas pipes, red for power lines, blue for water pipes, green for sewer, orange for communication lines, or the like. After the ground surface is labeled with field markings, the ground surface with the field markings can be surveyed using surveying equipment, such as theodolite, to determine real world coordinates associated with the buried underground utilities (615). Optionally, the above ground surface and the field markings can be laser scanned using a 3D laser scanner. Thereafter, a 3D digital model of the underground utility lines can be generated in a 3D modeling module, using at least data obtained from the ground penetrating radar and the real-world coordinates obtained from the field markings (617). Thus, the utility lines can be tied into the same coordinates as the above ground features. After generating the 3D digital model of the utility lines, the method steps (starting at step (413)) described in FIGS. 4A and 4B can be utilized to associate the 3D digital model of the underground utility lines with a marker for AR visualization of the 3D digital model using a mobile device.

While FIG. 6B discusses the use of ground penetrating radar, other underground detection techniques can be used in addition or in alternative to the ground penetrating radar to determine locations and geometric parameters associated with underground utility lines. For example, ground penetrating radar sensors, a seismic sensor, a nuclear magnetic resonance sensor, an electromagnetic sensor, and/or a cone penetrometer instrument can be used to generate a 2D or 3D map of underground utilities. Such a detection system and methods are described in U.S. Patent Application Publication No. 2009/0024326, which is incorporated by reference in its entirety for all purposes.

In another embodiment, a 3D digital model embedded with coordinate data can be generated by exposing and surveying portions of the buried underground utility lines by creating pot holes along the lines. For example, after a first exposed portion of the underground utility lines is surveyed using surveying equipment to determine their real world coordinates, the underground utilities in a second exposed portion can be surveyed. The locations of unexposed underground utility lines between the exposed portions can be extrapolated from the real world coordinates and elevation along with geometric parameters associated with the surveyed, exposed portions of underground utility lines. From these surveyed data, a 3D digital model of the underground utility lines can be generated.

In yet another embodiment, a 3D digital model embedded with coordinate data can be generated by surveying underground utility lateral lines connected to manholes using surveying rods and other suitable instruments. An example of manhole surveying instruments is described in U.S. Pat. No. 4,744,151, which is incorporated by reference in its entirety for all purposes. Through surveying, the manhole structure, diameter of pipe inlets and outlets, depths of inverts, real world coordinates of pipes and various structures can be determined. For example, by extending a surveying rod down a manhole, an elevation level of a top and/or bottom of pipes connected to the manhole can be determined. At the next manhole structure down the street, surveying measurements of the underground pipes can be performed again. The locations of the unexposed underground pipes and other utility lines between the manholes can be extrapolated using the surveyed locations of the underground utility lines at the manholes. From these surveyed data, a 3D digital model of the underground utility lines can be generated.

FIG. 6B and the above description related to surveying underground utility lines are merely exemplary, and other techniques for surveying and obtaining real world coordinates associated with underground utility lines can also be applied in embodiments of the present invention. One of ordinary skill in the art would recognize many variations, modifications, and alternatives. After the 3D digital model of underground utility lines is generated, it can be associated with a selected marker in an AR module and the selected marker can be fixed on the ground surface at predetermined coordinates as describe in FIGS. 4A and 4B. Subsequently, a mobile device running an augmented reality application can be used as described in relation to FIG. 4C to view an augmented image comprising a real view of the ground surface (e.g., pavement) in real-time overlaid with a 3D digital model of underground utilities. In addition, the user can walk around the marker on the pavement to view the buried utility lines under the pavement from all angles, and the AR perspective changes with the device's location and position. Viewing the 3D digital model of underground utilities from various angles allows the user to visualize separation and distance among different pipes and other underground utilities.

Figure 7:
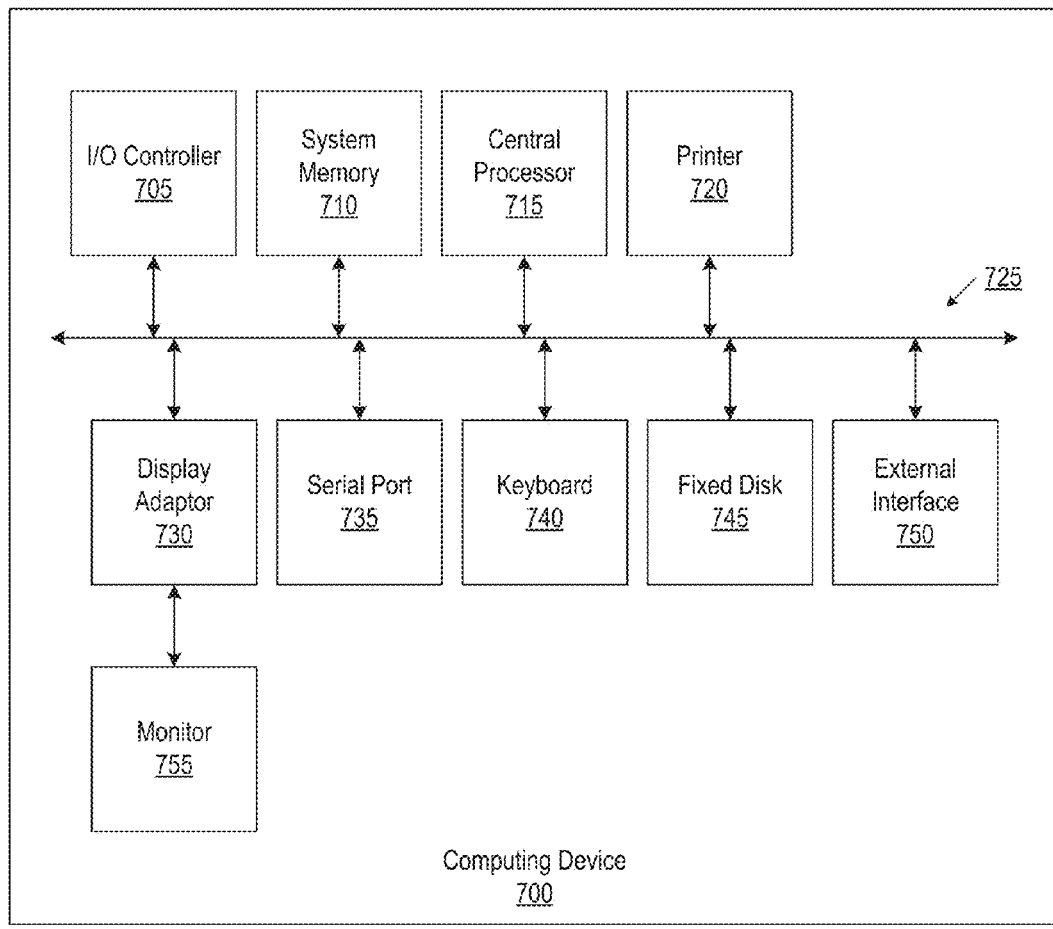
FIG. 7 shows a block diagram of a computer apparatus according to an embodiment of the present invention.

The various participants and elements described herein may operate one or more computer apparatuses (e.g., a server computer or a mobile device) to facilitate the functions described herein. Any of the elements in the above-described Figures, including any servers or databases, may use any suitable number of subsystems to facilitate the functions described herein. Examples of such subsystems or components are shown in FIG. 7. The subsystems shown in FIG. 7 are interconnected via a system bus 725. Additional subsystems such as a printer 720, keyboard 740, fixed disk 745 (or other memory comprising computer readable media), monitor 755, which is coupled to display adapter 730, and others are shown. Peripherals and input/output (I/O) devices, which couple to I/O controller 705 (which can be a processor or other suitable controller), can be connected to the computer system by any number of means known in the art, such as serial port 735. For example, serial port 735 or external interface 750 can be used to connect the computer apparatus to a wide area network such as the Internet, a mouse input device, or a scanner. The interconnection via system bus allows the central processor 715 to communicate with each subsystem and to control the execution of instructions from system memory 710 or the fixed disk 745, as well as the exchange of information between subsystems. The system memory 710 and/or the fixed disk 745 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

One or more features from any embodiment may be combined with one or more features of any other embodiment without departing from the scope of the invention.

A recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method for providing coordinate geometry augmented reality for visualizing 3D digital models of internal elements concealed behind external elements in a real environment, the method comprising:

capturing, using a camera of a mobile device, an image of a marker placed on an external element covering internal elements in the real environment;

analyzing, using a processor, the image of the marker to determine a 3D digital model of the internal elements associated with the marker;

retrieving, from data storage, a data file comprising the 3D digital model of the internal elements associated with the marker and relation data between the 3D digital model of the internal elements and the marker; and providing, on a display screen of the mobile device, an augmented reality image comprising a real view of the external element seen through the camera of the mobile device in real-time, overlaid with the 3D digital model of the internal elements in relation to the marker according to the relation data so that the 3D digital model of the internal elements is seen in a geometrically correct orientation with respect to the external element at a calculated distance in depth behind the external element in the real environment.

2. The method of claim 1 wherein the marker comprises a QR code.

3. The method of claim 1 wherein the marker comprises marking elements with a unique pattern that are decodable to determine the data file that comprises the 3D digital model of the internal elements and the relation data.

4. The method of claim 3 wherein the data file that comprises the 3D digital model of the internal elements and the relation data is retrieved from data storage of the mobile device or data storage of a remote server computer via a communication medium.

5. The method of claim 1 wherein the augmented reality image further comprises supplemental content related to the internal elements.

6. The method of claim 1, further comprising:

detecting a change of the mobile device's position and orientation relative to a position and orientation of the marker placed on the external element; and adjusting positioning and orientation of the 3D digital model of the internal elements contemporaneous to the detecting the change so that the 3D digital model of the internal elements remains seen in the geometrically correct orientation with respect to the external element on the display screen of the mobile device.

7. The method of claim 1 wherein the relation data include information related to a relative size, position, and orientation of the 3D digital model of the internal elements in relation to the marker.

8. The method of claim 1, wherein the mobile device is a mobile phone.

9. The method of claim 1 wherein the marker is placed at a predetermined set of coordinates.

10. A mobile device for providing coordinate geometry augmented reality for visualizing 3D digital models of internal elements concealed behind external elements in a real environment, the mobile device comprising:

a processor;

a computer-readable medium coupled to the processor and storing a plurality of instructions, which, when executed, cause the processor to provide coordinate geometry augmented reality, the plurality of instructions comprising:

instructions that cause the processor to capture, using a camera of a mobile device, an image of a marker placed on an external element covering internal elements in the real environment;

instructions that cause the processor to analyze the image of the marker to determine a 3D digital model of the internal elements associated with the marker;

instructions that cause the processor to retrieve, from data storage, a data file comprising the 3D digital model of the internal elements associated with the marker and relation data between the 3D digital model of the internal elements and the marker; and instructions that cause the processor to provide, on a display screen of the mobile device, an augmented reality image comprising a real view of the external element seen through the camera in real-time, overlaid with the 3D digital model of the internal elements in relation to the marker according to the relation data so that the 3D digital model of the internal elements is seen in a geometrically correct orientation with respect to the external element at a calculated distance in depth behind the external element.

11. The mobile device of claim 10 wherein the marker comprises marking elements with a unique pattern that are decodable to determine the data file that comprises the 3D digital model of the internal elements and the relation data.

12. The mobile device of claim 10 wherein the data file is retrieved from the data storage of the mobile device or the data storage of a remote server computer via a communication medium.

13. The mobile device of claim 10 wherein the augmented reality image further comprises supplemental content related to the internal elements.

14. The mobile device of claim 10 wherein the mobile device is a mobile phone.

* * * * *